US012671952B2

(12) United States Patent
Moradi Ashour et al.

(10) Patent No.: US 12,671,952 B2
(45) Date of Patent: Jun. 30, 2026

(54) METHOD OF RENDERING AN AUDIO ELEMENT HAVING A SIZE, CORRESPONDING APPARATUS AND COMPUTER PROGRAM

(71) Applicant: Telefonaktiebolaget LM Ericsson (publ), Stockholm (SE)

(72) Inventors: Chamran Moradi Ashour, Stockholm (SE); Tommy Falk, Spånga (SE); Werner De Bruijn, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 142 days.

(21) Appl. No.: 18/700,214

(22) PCT Filed: Oct. 11, 2022

(86) PCT No.: PCT/EP2022/078163
§ 371 (c)(1),
(2) Date: Apr. 10, 2024

(87) PCT Pub. No.: WO2023/061965
PCT Pub. Date: Apr. 20, 2023

(65) Prior Publication Data
US 2025/0227427 A1 Jul. 10, 2025

Related U.S. Application Data

(60) Provisional application No. 63/254,389, filed on Oct. 11, 2021.

(51) Int. Cl.
*H04S 7/00* (2006.01)

(52) U.S. Cl.
CPC ........... *H04S 7/302* (2013.01); *H04S 2400/11* (2013.01)

(58) Field of Classification Search
CPC ... H04S 7/302; H04S 2400/11; H04S 2420/01
See application file for complete search history.

(56) References Cited

U.S. PATENT DOCUMENTS 5,768,393 A 6/1998 Mukojima et al.
2006/0120534 A1 6/2006 Seo et al.
(Continued)

FOREIGN PATENT DOCUMENTS

EP 3 879 856 A1 9/2021
WO 2014/036121 A1 3/2014
(Continued)

OTHER PUBLICATIONS

International Search Report and Written Opinion issued in International Application No. PCT/EP2022/078163 dated Apr. 28, 2023 (26 pages).
Potard, G. et al., "Report of the second MPEG-4 AudioBIFS Sound Source Wideness Core Experiment", International Organisation for Standardisation Organisation Internationale De Normalisation ISP/IEC JTC1/SC29/WG11 Coding of Moving Pictures and Audio, Dec. 2002 (24 pages).
(Continued)

*Primary Examiner* — Brian T Pendleton
(74) *Attorney, Agent, or Firm* — Rothwell, Figg, Ernst & Manbeck, P.C.

(57) ABSTRACT

A method (1900) for rendering an audio element (102) is provided. The method comprises obtaining (s1902) size information indicating a size of a representation of the audio element and/or distance information indicating a distance between the audio element and a listener. The method also comprises, based on the size information and/or the distance information, determining (s1904) a number of virtual loudspeakers to use for rendering the audio element.

19 Claims, 19 Drawing Sheets

(56) References Cited

U.S. PATENT DOCUMENTS

| | | | | |
|---|---|---|---|---|
| 2019/0020968 | A1 | 1/2019 | Suenaga et al. | |
| 2020/0068332 | A1* | 2/2020 | Goldberg | H04S 7/302 |
| 2020/0367009 | A1* | 11/2020 | Family | H04S 7/302 |
| 2021/0289309 | A1 | 9/2021 | Herre et al. | |
| 2021/0306792 | A1 | 9/2021 | De Bruijn | |
| 2023/0262405 | A1* | 8/2023 | Falk | H04S 7/303 381/303 |

FOREIGN PATENT DOCUMENTS

| | | | |
|---|---|---|---|
| WO | 2021/099617 | A1 | 5/2021 |
| WO | 2021/180820 | A1 | 9/2021 |

OTHER PUBLICATIONS

JISC, "Information technology—High efficiency coding and media delivery in heterogeneous environments—Part 3: 3D audio", ISO/IEC 1/SC 29, Oct. 12, 2016 (799 pages).

BTF Render Group, "ADM Renderer for use in Next Generation Audio Broadcasting", EBU Operating Eurovision and Euroradio, Tech 3388, Mar. 2018 (57 pages).

Schissler, C. et al., "Efficient HRTF-based Spatial Audio for Area and Volumetric Sources", IEEE Transactions on Visualization and Computer Graphics, vol. 22, No. 4, Apr. 2016 (11 pages).

International Preliminary Report on Patentability issued in International Application No. PCT/EP2022/078163 dated Apr. 16, 2024 (19 pages).

* cited by examiner

METHOD OF RENDERING AN AUDIO ELEMENT HAVING A SIZE, CORRESPONDING APPARATUS AND COMPUTER PROGRAM

CROSS REFERENCE TO RELATED APPLICATIONS

This application is a 35 U.S.C. § 371 National Stage of International Patent Application No. PCT/EP2022/078163, filed 2022 Oct. 11, which claims priority to U.S. Provisional Patent Application No. 63/254,389, filed 2021 Oct. 11. The above identified applications are incorporated by this reference.

TECHNICAL FIELD

This disclosure relates to methods and apparatus for configuring virtual loudspeakers.

BACKGROUND

Spatial audio rendering is the process used for presenting an audio element within virtual reality (VR), augmented reality (AR), or mixed reality (MR) in order to give the listener the impression that the sound is coming from physical source(s) that is located at certain position(s) and that has a certain size and a certain shape (i.e., extent).

The presentation can be made using headphones or speakers. If the presentation is made using headphones, the rendering process is called binaural rendering. Binaural rendering uses spatial cues of the human spatial hearing which enables the listener to recognize the direction from which sounds are coming from. The spatial cues include Inter-aural Time Difference (ITD), Inter-aural Level Difference (ILD), and/or spectral difference.

The most common form of spatial audio rendering is based on the concept of point sources. A point source is defined to emanate sound from one specific point. Thus, a point-source does not have any extent. Accordingly, in order to render an audio source with an extent, different methods need to be used.

One of the methods for rendering an audio source with an extent is to create multiple duplicate copies of a mono audio object at positions around the mono audio object's position. This creates the perception of a spatially homogeneous object with a certain size. This concept is used, for example, in the "object spread" and "object divergence" features of the MPEG-H 3D Audio standard (clauses 8.4.4.7—"Spreading" and 18.1—"Element Metadata Preprocessing"), and in the "object divergence" feature of the EBU Audio Definition Model (ADM) standard (EBU ADM Renderer Tech 3388, Clause 7.3.6: "Divergence").

This idea using a mono audio source has been developed further in Efficient HRTF-based Spatial Audio for Area and Volumetric Sources", IEEE Transactions on Visualization and Computer Graphics 22(4):1-1, January 2016. According to the article, the area-volumetric geometry of an audio object may be projected onto a sphere around the listener and the sound can be rendered to the listener using a pair of head-related (HR) filters that is evaluated as the integral of all the HR filters covering the geometric projection of the audio object on the sphere. For a spherical volumetric source, this integral has an analytical solution, while for an arbitrary area-volumetric source geometry, the integral is evaluated by sampling the projected source surface on the sphere using what is called a Monte Carlo ray sampling.

Another method for rendering an audio source with an extent is to render a spatially diffuse component in addition to the mono audio signal. The spatially diffuse component creates the perception of a somewhat diffuse object that, in contrast to the original mono object, has no distinct pin-point location. This concept is used, for example, in the "object diffuseness" feature of the MPEG-H 3D Audio standard (clause 18.11) and the EBU ADM "object diffuseness" feature (EBU ADM Renderer Tech 3388, Clause 7.4: "Decorrelation Filters").

The combination of the above two methods is also known, for example, in the EBU ADM "object extent" feature which combines the creation of multiple copies of a mono audio object with addition of diffuse components. See EBU ADM Renderer Tech 3388, Clause 7.3.7: "Extent Panner."

These methods, however, do not provide a method of rendering of audio elements that have a distinct "spatially-heterogeneous" character, i.e., an audio element that has a certain amount of spatial source variation within its spatial extent. Often these sources are made up of a sum of a multitude of sources, e.g., the sound of a forest or the sound of a cheering crowd. Most of the known solutions are only able to create objects with either a "spatially-homogeneous" (i.e., with no spatial variation within the element), or a spatially diffuse character, which may be too limited for rendering some of the examples given above in a convincing way.

Other techniques exist, for rendering these heterogeneous audio elements. For example, the audio element may be represented by a multi-channel audio recording and the rendering may use several virtual loudspeakers to represent the extent of the audio element and the spatial variation within it. By placing the virtual loudspeakers at positions that correspond to the extent of the audio element, an illusion of audio emanating from the extent can be conveyed.

In many cases, the extent of an audio element can be described adequately using a basic shape (e.g., a sphere or a box). But sometimes the shape of the audio element may be more complicated, and thus needs to be described in a more detailed form, e.g., with a mesh structure or a parametric description format. In these cases, the real-time rendering needs to calculate how the extent of the audio element should be rendered depending on the current position of the audio element with respect to the listening position.

One existing solution for rendering an audio element with a defined spatial extent is described in WO 2021180820, which is hereby incorporated by reference in its entirety. This solution involves a method that simplifies the complex extent of an audio element into a one-dimensional (1D) representation or a two-dimensional (2D) representation that describes the width and/or height of the extent, as seen from the listening position. In this disclosure, the complex extent that is simplified (i.e., the 1D representation or the 2D representation) is referred as a simplified extent.

Certain challenges exist. Generally, the number of virtual loudspeakers is predefined. This could be problematic since experiments show that, depending on the extent of the audio object and the position of the listener relative to the audio object, different numbers of virtual loudspeakers may be required to render the audio object (i.e., producing an audio signal representing the audio object) in an optimal way.

For example, if two or more virtual loudspeakers are used for producing an audio signal representing an audio object, then depending on the extent of the audio object and the position of the listener relative to the audio object, in some situations, the virtual loudspeakers may be too close to each other such that a pronounced comb-filtering effect that degrades the overall quality of the rendered audio object may occur.

FIG. 5 illustrates how the comb-filtering effect can occur. As shown in FIG. 5, when two correlated audio sources 502 and 504 are too close to each other, there may be a comb-filtering interference caused by the overlapping audio produced by the audio sources 502 and 504. In other words, because of this superposition of the multiple audio, a portion of a generated audio signal associated with certain frequencies may be attenuated or amplified, thereby creating audible artifacts.

For example, if (i) a white noise source is rendered using a virtual loudspeaker placed at a front-middle position of a listener and (ii) the same white noise source is rendered using a virtual loudspeaker that moves from a front-right position towards a front-left position, thereby passing the front-middle position, as the moving virtual loudspeaker passes through the front-middle position at which the stationary virtual speaker is located, there will be a mix of the audio from the two virtual loudspeakers, thereby resulting in creating in the audio spectrum notches that change as the moving virtual loudspeaker moves. In some scenarios, the changes may be stepwise changes. The stepwise changes may result from the use of a head related transfer function (HRTF) dataset with a limited spatial resolution and without interpolations between the HRTF sample-points.

If the extent of the audio object is large and/or the listener is close to the audio object, a higher number of virtual loudspeakers may be needed to properly render all the spatial information of the audio object. This is especially true if the audio object is represented with a multi-channel audio signal which provides spatial information in both height and width dimensions.

On the other hand, if the size of the audio object is small or the distance between the listener and the audio object is large, using multiple virtual loudspeakers to generate an audio signal representing the audio object may not be the most efficient solution.

Accordingly, in one aspect, there is provided a method for rendering an audio element. The method comprises obtaining size information indicating a size of a representation of the audio element and/or distance information indicating a distance between the audio element and a listener; and based on the size information and/or the distance information, determining a number of virtual loudspeakers to use for rendering the audio element.

In another aspect, there is provided a computer program comprising instructions which when executed by processing circuitry cause the processing circuitry to perform the method of any one of embodiments described above.

In another aspect, there is provided an apparatus for rendering an audio element. The apparatus is configured to obtain size information indicating a size of a representation of the audio element and/or distance information indicating a distance between the audio element and a listener; and based on the size information and/or the distance information, determine a number of virtual loudspeakers to use for rendering the audio element.

In another aspect, there is provided an apparatus, the apparatus comprising a memory and processing circuitry coupled to the memory. The apparatus is configured to perform the method of any one of embodiments described above.

Some embodiments of this disclosure provide an efficient method of rendering a heterogeneous audio element by adaptively deciding the number of virtual loudspeakers needed for rendering the audio element based on the size of the audio element and/or the distance between the audio element and the listening position. By reducing the number of virtual loudspeakers used for the rendering, the problem of the comb-filtering effects resulting from the use of two or more loudspeakers that are too close to each other can be avoided. Also, by reducing the number of virtual loudspeakers, the embodiments allow avoiding the excessive complexity resulting from using too many virtual loudspeakers to render an audio element with little extent or that is far away from the listener.

BRIEF DESCRIPTION OF THE DRAWINGS

The accompanying drawings, which are incorporated herein and form part of the specification, illustrate various embodiments.

DETAILED DESCRIPTION

Figure 1:
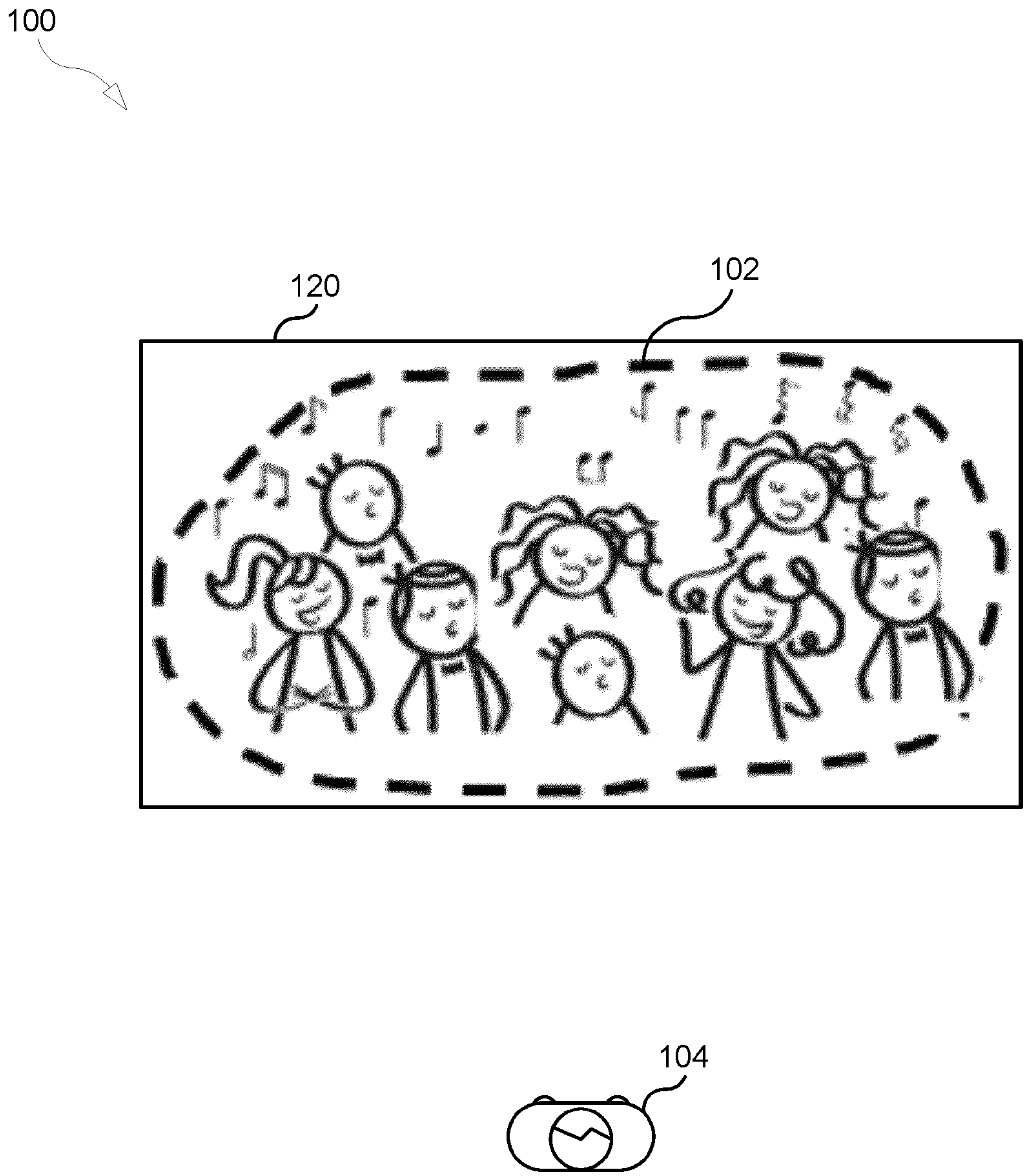
FIG. 1 shows an exemplary VR environment 100.

FIG. 1 shows an exemplary VR environment 100. In the VR environment 100, a listener 104 is standing in front of an audio element 102 which is a choir. Because the choir includes a plurality of singers each of which constitutes an audio sub-element and has a unique audio characteristic, the audio element 102 has a distinct spatially-heterogeneous character. Because the extent of the audio element 102 is too complex to represent, in some embodiments, the extent of the audio element 102 is simplified into simple extent 120. The simple extent 120 of the audio element 102 is used for rendering the audio element. In FIG. 1, the simple extent 120 is a 2D representation of the audio element 102.

Figure 2A:
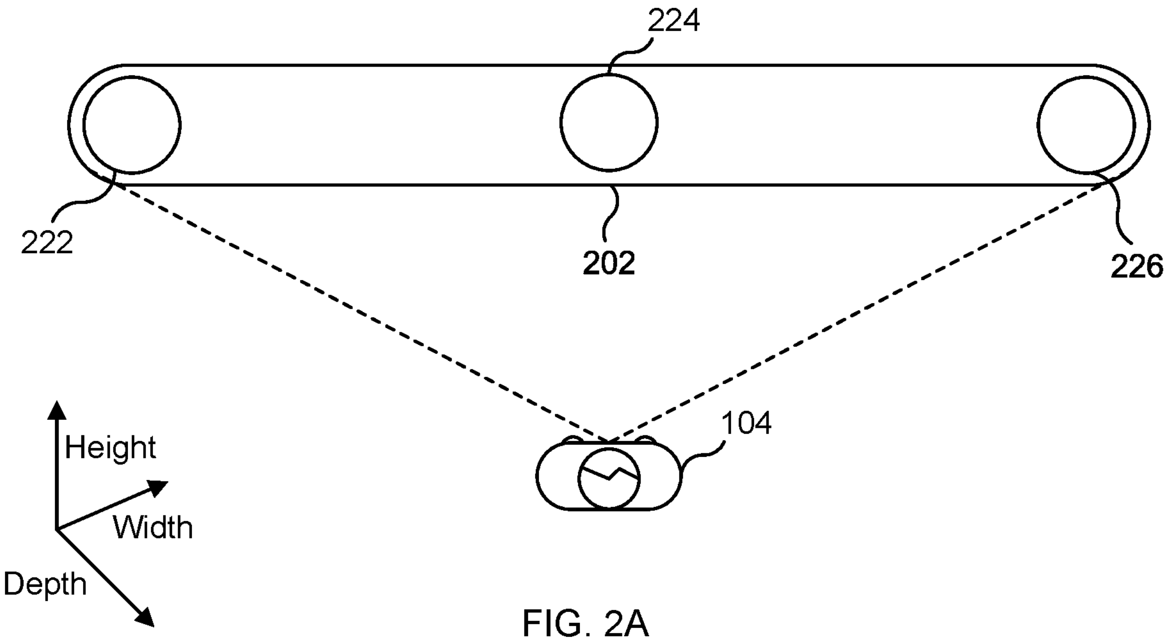
FIGS. 2A and 2B show simple extent of an audio element according to some embodiments.
Figure 2B:
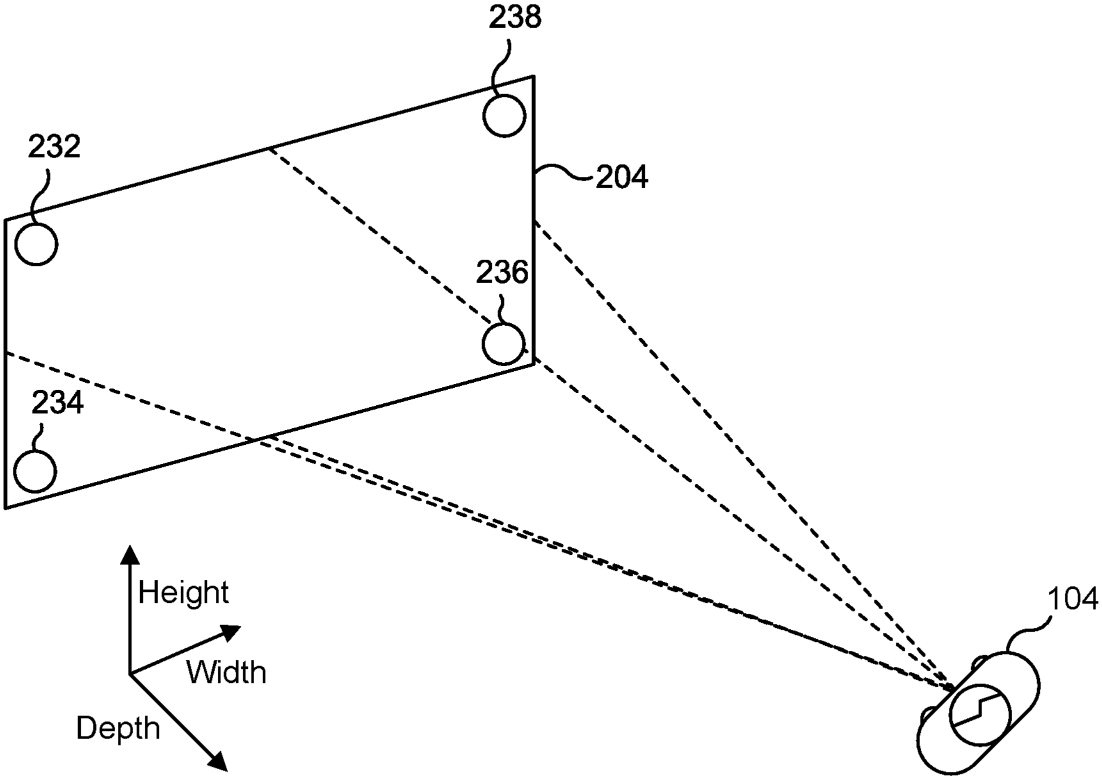

FIGS. 2A and 2B show different types of simple extent 120 of the audio element 102. More specifically, FIG. 2A shows a 1D representation 202 of the audio element 102 and FIG. 2B shows a 2D representation 204 of the audio element 102.

The 1D representation 202 and/or the 2D representation 204 may be used for rendering the audio element 102. Here, a multi-channel audio signal may be generated and used for audio rendering such that the perceived spatial extent matches the simplified extent. To render the 1D representation 202, virtual loudspeakers 222, 224, and 226 may be used. Similarly, to render the 2D representation 204, virtual loudspeakers 232, 234, 236, and 238 may be used. The positions and/or the locations of the virtual loudspeakers are shown in FIGS. 2A and 2B for illustration purpose only.

If either the width or the height of the 2D representation 204 becomes negligible, the representation of the audio element 102 may be switched from the 2D representation 204 to the 1D representation 202. Similarly, if both of the width and the height of the 2D representation 204 becomes negligible, the representation of the audio element 102 may be switched from the 2D representation 204 to a point source representation.

Figure 4:
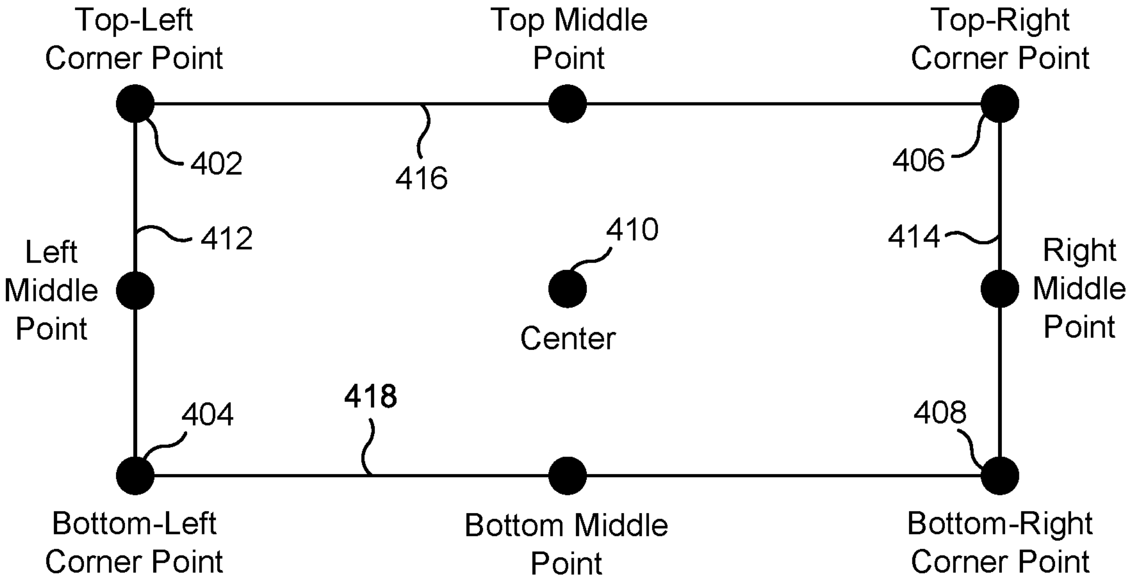
FIG. 4 shows an example of simplified extent of an audio element according to some embodiments.
Figure 5:
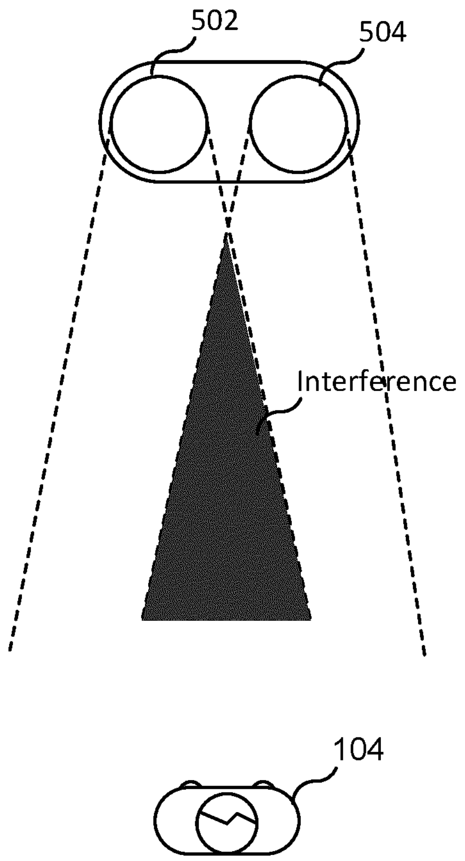
FIG. 5 illustrates a comb-filtering effect.

FIG. 4 shows an example of simplified 2D extent (a.k.a., 2D representation) of the audio element 102 (e.g., when the audio element 102 is a spatially bounded audio element) according to some embodiments. The 2D representation may be defined by a center point 410, a left side (edge) 412, a right side 414, a top side 416, and a bottom side 418. Corner points 402, 404, 406, and 408 of the 2D representation may be obtained by using the center point 410 and one or more of the four sides 412, 414, 416, and 418.

According to some embodiments, the corner points may be used to place virtual loudspeakers. If the width and the height of the 2D representation shown in FIG. 4 become negligible, then the representation of the audio element 102 is transitioned from the 2D representation to the point representation. Similarly, if either the width or the height of the 2D representation shown in FIG. 4 becomes negligible, then the representation of the audio element 102 is transitioned from the 2D representation to the 1D representation.

Figure 3A:
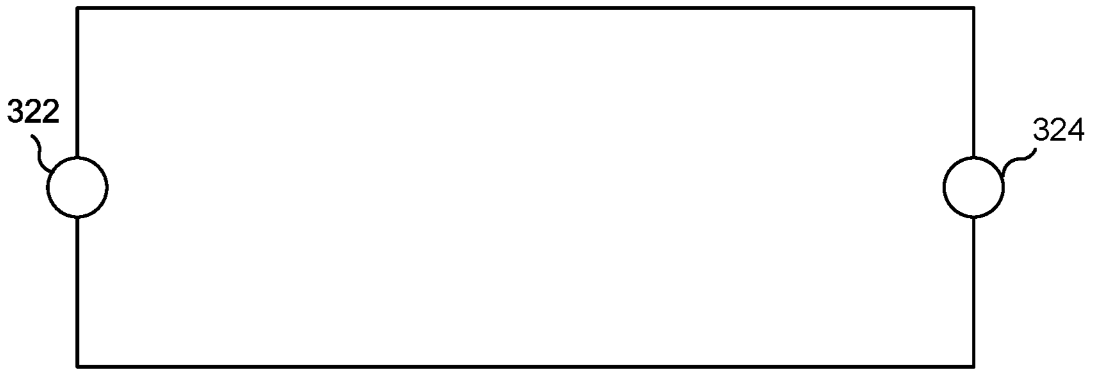
FIGS. 3A-3C show different arrangement of virtual loudspeakers according to some embodiments.
Figure 3B:
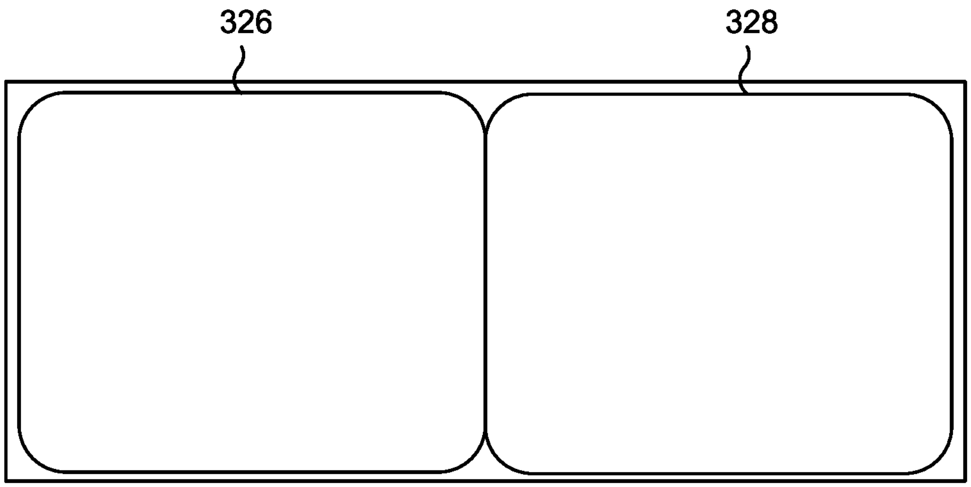
Figure 3C:
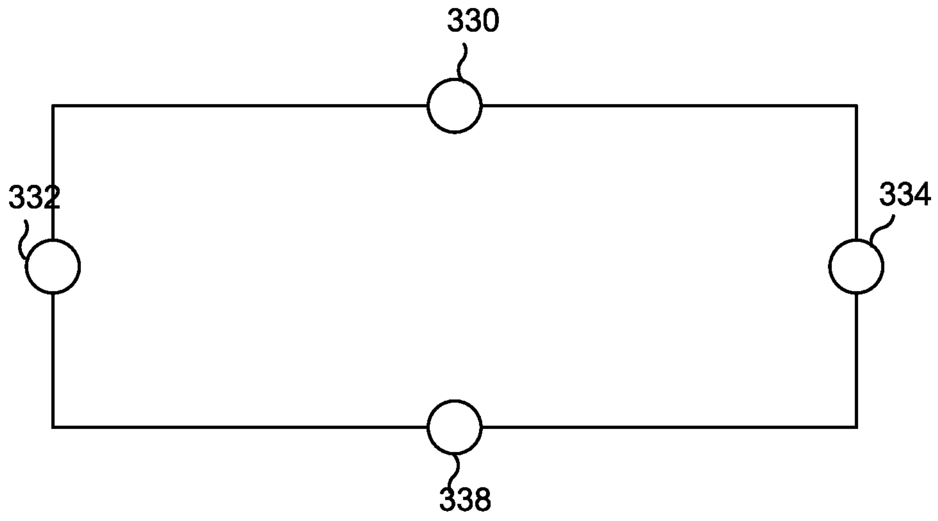

FIGS. 3A-3C show different ways of rendering the audio element 102 using a 2D representation 204 of the audio element 102. As shown in FIGS. 3A-3C, different arrangements of virtual audio sources (a.k.a., virtual loudspeakers) may be used for the rendering.

In FIG. 3A, two virtual loudspeakers 322 and 324 are used to represent the audio element 102 with a stereo signal. In FIG. 3B, two virtual loudspeakers 326 and 328 with HRTFs that represent areas which can be adjusted to fit the extent of the plane are used to represent the audio element 102 with a stereo signal. In FIG. 3C, four virtual loudspeakers 330, 332, 334, and 338 are used to represent the audio element with a four-channel audio signal. The four channels may represent the spatial information in both the horizontal and vertical planes.

Some embodiments of this disclosure provide a solution of adjusting the number of virtual loudspeakers for rendering the audio element 102 (a.k.a., an audio object or an audio source) based on the extent of the audio element 102 and the position of the listener 104 relative to the audio element 102. More specifically, in some embodiments, a method is provided for monitoring an azimuth angle (a.k.a., a width angle) and an elevation angle (a.k.a., a height angle) from the listener 104's point of view towards (the simplified extent corresponding to) the audio element 102, and determining (i) the number of virtual loudspeakers that is optimal for rendering the current frame of the audio signal, and (ii) the positions of the virtual loudspeakers (e.g., where to put the virtual loudspeakers on (the simplified extent corresponding to) the audio element 102).

Rendering an audio element with an extent may involve placing a number of virtual loudspeakers on the audio element such that audio signal(s) for rendering the audio element produce a plausible representation of the audio element. Depending on the degree (i.e., size) (e.g., height, width, etc.) of the extent (or the corresponding simplified extent) of the audio element and the distance between the listener and the audio element, a different number of virtual loudspeakers may be needed to produce a subjectively convincing representation of the audio element.

For example, for an audio element with small extent, fewer number of virtual loudspeakers may be preferred as large number of virtual loudspeakers may cause comb-filtering effects if the generated audio signals have some amount of correlation. On the other hand, when the listener is close to a large audio element (i.e., the audio element with large extent), a higher number of virtual loudspeakers may be needed to avoid the problem of a psychoacoustical hole in front of listener.

Figure 6A:
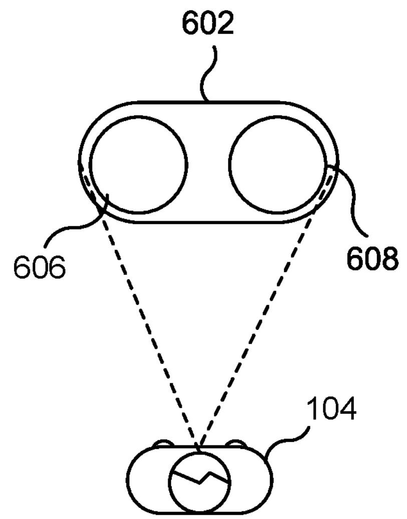
FIGS. 6A and 6B show scenarios where too many and too few virtual loudspeakers are used for audio rendering.
Figure 6B:
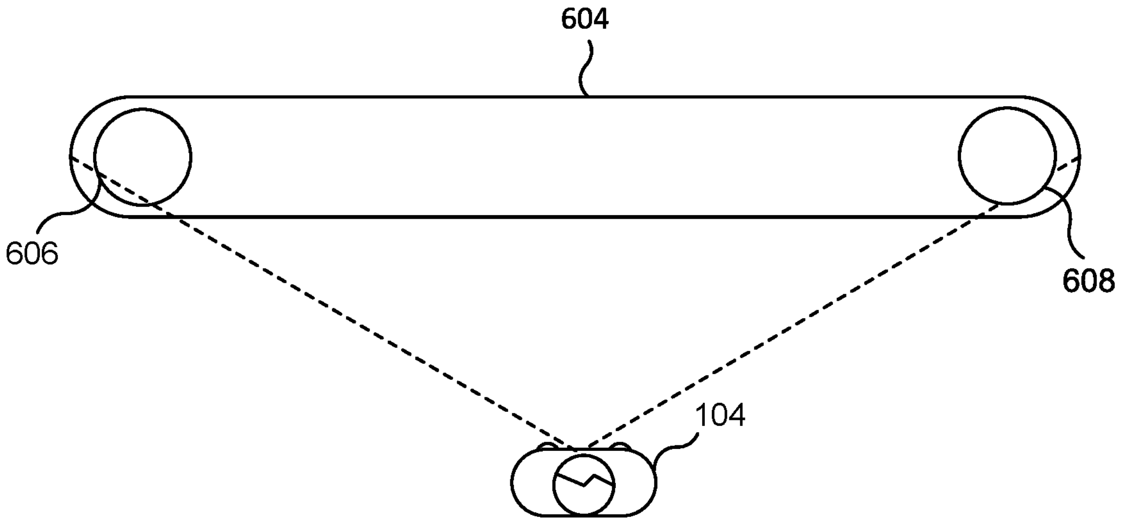

FIGS. 6A and 6B show scenarios where too many and too few virtual loudspeakers are used for rendering the audio element 102 with different 1D representations 602 and 604. Even though, FIGS. 6A and 6B only show the 1D representation, in other embodiments, the same explanation is applicable to the 2D/3D representation.

In FIG. 6A, the 1D representation 602 of the audio element 102 is too small to be properly represented by two virtual loudspeakers 606 and 608 since the two virtual loudspeakers 606 and 608 of which locations are defined by the 1D representation 602 are too close to each other, thereby causing the comb-filtering effect.

On the other hand, in FIG. 6B, the 1D representation 604 of the audio element 102 is too large to be properly represented by only two virtual loudspeakers 606 and 608 of which locations are defined by the 1D representation 604, thereby resulting in an undesirable psychoacoustical hole in front of the listener 104.

Accordingly, based on the extent of an audio element and a distance between the audio element and the listener, a different number of virtual loudspeakers may be needed in order to properly render the audio element. Also, in case an audio element is represented by multiple audio channels, it may be better to render the audio element with a higher number of virtual loudspeakers so that all spatial information indicated by the multiple audio channels is rendered.

For example, in case an audio element has audio channels representing the spatial information in the vertical dimension, then the rendering setup needs virtual loudspeakers positioned so they can render the vertical as well as horizontal spatial information.

Therefore, it is desirable to adjust the number of virtual loudspeakers to use for rendering an audio element during audio rendering process based on the extent of the audio element (e.g., the height and/or the width of the audio element) and/or the position of the listener with respect to the audio element, in order to provide a plausible representation of the audio element.

Figure 7A:
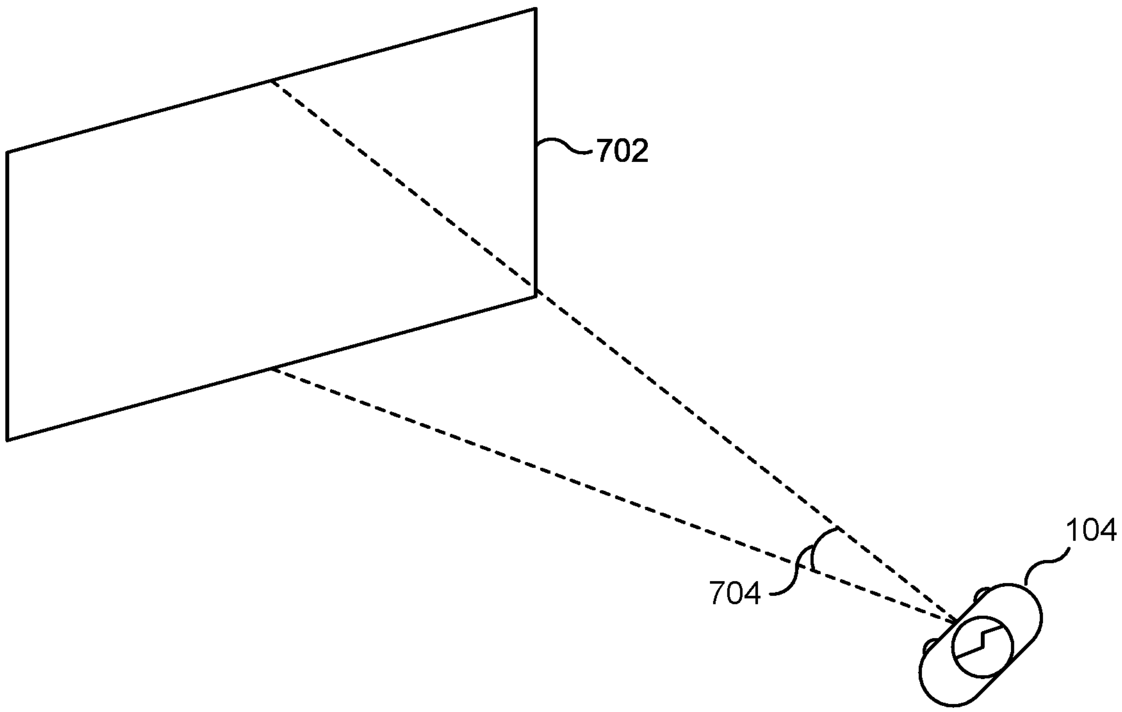
FIGS. 7A and 7B show parameters (i.e., azimuth angle and elevation angles) used for audio rendering.
Figure 7B:
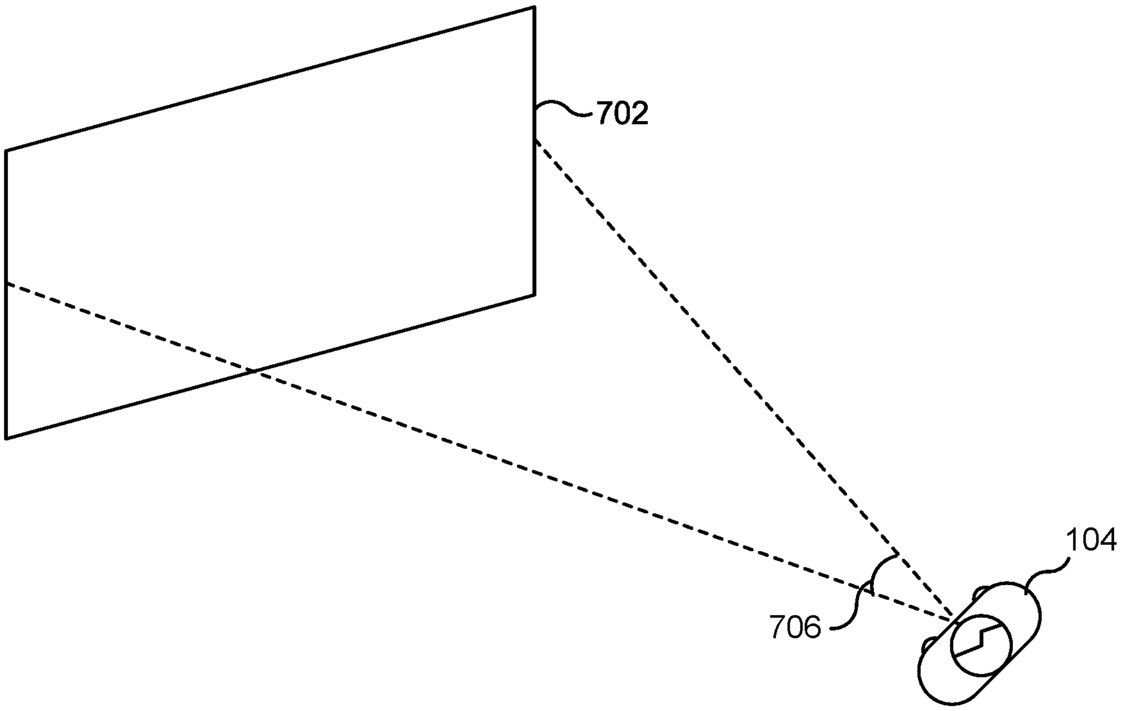

In order to set or adjust the number of virtual loudspeakers to use for rendering an audio element based on the extent of the audio element and/or the position of the listener relative to the audio element, azimuth angle (a.k.a., the width angle)

and elevation angles (a.k.a., the height angle) as shown in FIGS. 7A and 7B may be used as the parameters for the function of determining the number of virtual loudspeakers to use for audio rendering. For example, $$N_{SP_i} = f(a_i, e_i),$$

where $N_{SP_1}$ is the number of virtual loudspeakers in $i^{th}$ audio frame, $a_i$ and $e_i$ are azimuth and elevation angles respectively in the $i^{th}$ audio frame.

FIGS. 7A and 7B show how the height angle 704 and the width angle 706 are defined. The height angle 704 may represent the height of the 2D representation 702 of the audio element 102 and may be determined based on the position of the listener 104 with respect to the audio element 102. For example, as the listener 104 moves towards the audio element 102 or as the height of the 2D representation 702 increases, the height angle 704 may increase. The width angle 706 may represent the width of the 2D representation 702 and may be determined based on the position of the listener 104 with respect to the audio element 102. As the listener 104 moves towards the audio element 102 or as the width of the audio element 102 increases, the width angle 706 increases.

As discussed above, to provide a plausible representation of the audio element 102, it may be desirable to adjust the number of virtual loudspeakers to use for audio rendering based on the extent of the audio element and/or the position of the listener with respect to the audio element for every audio frame.

However, changing the number of virtual loudspeakers between frames may have a negative impact on gain stability between those frames. To overcome this negative impact, the overall gain of all virtual loudspeakers may follow a constant gain rule. In other words, regardless of whether and/or how the number of virtual loudspeaker is changed, the sum of the gains of all virtual loudspeakers should remain the same in each frame.

For example, in a scenario where there is one virtual loudspeaker in frame #1, which has a gain value of 1, if, in frame #2, the number of virtual loudspeakers is changed to three, then the sum of the gains of the three virtual loudspeakers should be 1. This zero-sum concept may be formulated as follows:

$$OV_{G_i} = \sum_{n=1}^{N_i} gc_i * SG_{n,i} \qquad \text{Equation (1)}$$

where i is an index of the current frame, $OV_{G_i}$ is the overall gain of all virtual loudspeakers in $i^{th}$ frame, $N_i$ is number of virtual loudspeakers in $i^{th}$ frame, $gc_i$ is the gain factor of each virtual loudspeakers in frame $i^{th}$ and is $gc_i=1/N_i$ and $SG_{n,i}$ is the gain of $n^{th}$ virtual loudspeaker in $i^{th}$ frame.

The above equation assumes that the signals going to each virtual loudspeaker are correlated. If the signals are completely uncorrelated, the gains may be adjusted according to a constant power rule. In other words, the gains may be adjusted in a way that is preserving the energy rather than the amplitude. In most cases, the signals will be at least partly correlated, which means that preserving the amplitude might be desirable.

A more elaborate solution may be calculating the gain according to both the amplitude and energy preserving rules and using a gain that is a balance between these two depending on the actual amount of correlation between the channels of the signal.

The gain adjustment method described above may be a complementary step and does not undermine the necessity of further gain adjustments in other steps of the renderer.

In some embodiments, the virtual loudspeakers setup may be further optimized by adapting the positions of the virtual loudspeakers to the horizontal and height angles.

$$P_{SP_{n,i}} = f(a_i, e_i)$$

where $P_{SP_{n,i}}$ is position of the $n^{th}$ virtual loudspeaker in $i^{th}$ frame, $a_i$ and $e_i$ are azimuth (horizontal) and elevation (vertical) angles respectively.

Figure 8A:
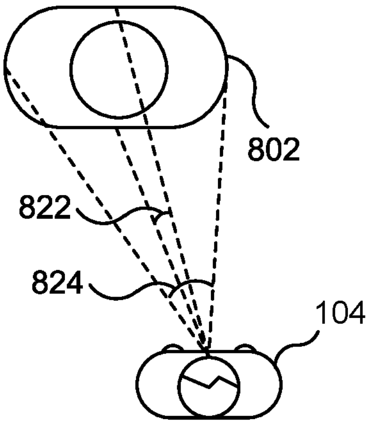
FIGS. 8A-8C show different scenarios where different number and position(s) of virtual loudspeakers may be optimal.
Figure 8B:
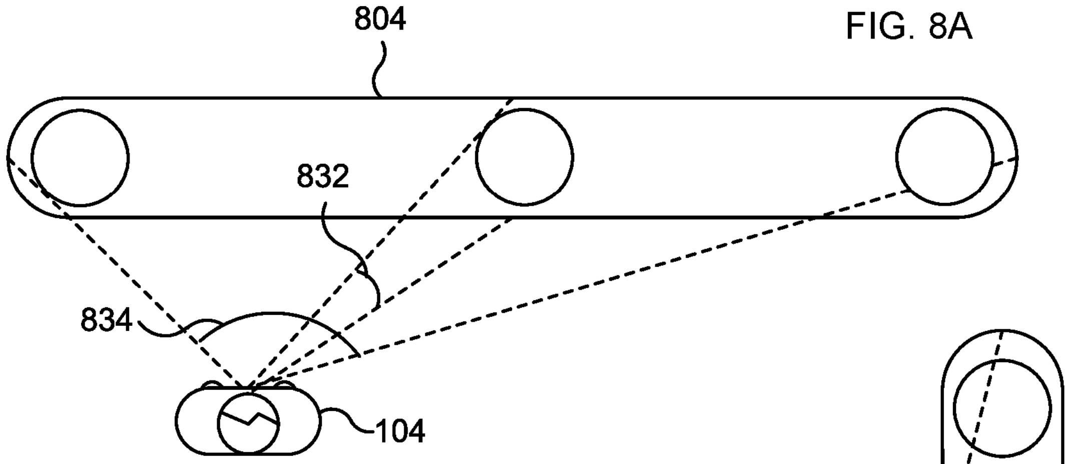
Figure 8C:
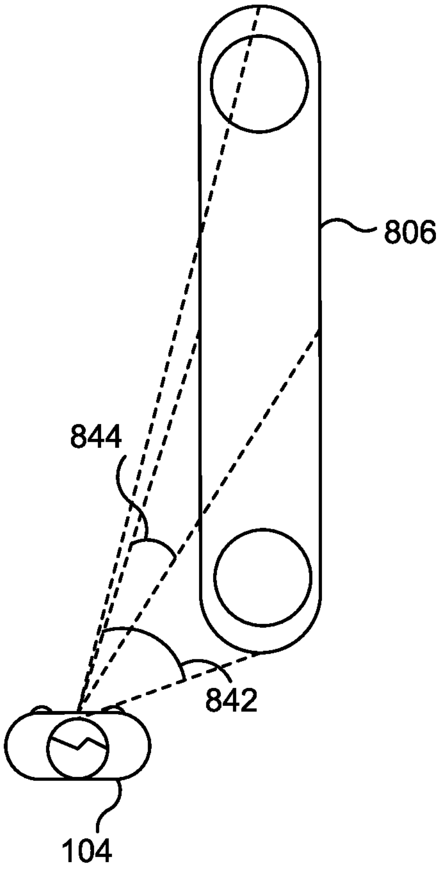

FIGS. 8A-8C show how the number and the position(s) of the virtual loudspeaker(s) for rendering the audio element 102 can be determined based on the width angle and the height angle.

In FIG. 8A, the width angle 824 and the height angle 822 are small, and thus using one virtual loudspeaker located at the center of the representation 802 of the audio element 102 is optimal for rendering the audio element 102. As explained above, the width angle 824 and the height angle 822 are small when (i) the size of the representation 802 is very small or (ii) the listener 104 is very far from the representation 802.

In FIG. 8B, the listener 104 is close the representation 804 of the audio element 102 wherein the representation 804 has small height and large width, thereby resulting in large width angle 834 but small height angle 832. In this scenario, the optimal number of the virtual loudspeakers can be 3 and they may be placed horizontally next to each other.

FIG. 8C shows an example of a representation 806 that has small width but large height, there by resulting in large height angle 842 but small width angle 844. For this scenario, using two virtual loudspeakers that are vertically placed next to each other may be an optimal setup to render the audio element 102.

In some embodiments, the number of virtual loudspeakers to use for audio rendering may be selected from a group of predetermined values (e.g., 1, 3, 5, etc.), the selection depending on the width angle and the height angle.

When both the width angle and the height angle are very small, e.g., less than one or more threshold values (like the scenario shown in FIG. 9A), a point source representation (e.g., 902 shown in FIG. 9A) may be used as the representation of the audio element 102, and thus only one virtual loudspeaker may be needed and used to render the audio element 102. In such case, the virtual loudspeaker may be placed in the center of the audio element.

On the other hand, if only one of the width angle and the height angle is very small, e.g., less than one or more threshold values (like the scenario shown in FIG. 9B or 9C) and another of the width angle and the height angle is large enough (e.g., larger than one or more threshold values), a 1D representation (e.g., 904 or 906 shown in FIG. 9B or 9C) may be used as the representation of the audio element 102 and three virtual loudspeakers may be used to render the audio element 102.

When both the width angle and the height angle are large enough (like the scenario shown in FIG. 9D), a 2D representation (e.g., 908 shown in FIG. 9D) may be used as the representation of the audio element 102 and five virtual loudspeakers may be used to render the audio element 102.

In such scenario, one of the five virtual loudspeakers may be located at the center of the 2D representation and the remaining four virtual loudspeakers maybe located at the corners of the 2D representation.

The terms "too small," and "large enough" may be defined in terms of reducing or preventing the comb-filtering effect and the psychoacoustical hole. The terms may be defined mathematically as follows:

$$h_{c(i)} = \begin{cases} 0, & \sin(\alpha) < Ch_{thr} \quad \text{(too small)} \\ 1, & \text{else} \quad \text{(large enough)} \end{cases}$$

$$v_{c(i)} = \begin{cases} 0, & \sin(\beta) < Cv_{thr} \quad \text{(too small)} \\ 1, & \text{else} \quad \text{(large enough)} \end{cases}$$

where $h_c(t)$ and $v_{c(i)}$ are flags in $i^{th}$ frame and they are used for deciding the number of virtual loudspeakers.

$\alpha=\alpha$ (which is the horizontal angle)/2 and $\beta=e$ (which is the vertical angle)/2, and $Ch_{thr}\in(0,1]$ and $Cv_{thr}\in(0,1]$ are the constants defining ranges of the horizontal and height angles that are considered to be "too small" and/or "large enough."

The reason why a half of the width angle or a half of the height angle is used to obtain $h_{c(i)}$ and $v_{c(i)}$ is that theoretically each of the width angle and the height angle can be any value that is greater than 0 but less than or equal to $\pi$ (i.e., a & $e\in(0, \pi]$). Since the value of sin(x) is proportional to the value of x as long as x is between 0 and 90 degree, by dividing each of the width angle and the height angle by 2, $\alpha$ and $\beta$ are within a range between 0 and 90 degree (i.e., $\alpha$ & $\beta\in(0, \pi/2]$).

In some embodiments, the number of virtual loudspeakers in $i^{th}$ frame may be formulated as below:

$$N_{SP_i} = \begin{cases} 1, & h_{c(i)} == 0 \text{ and } v_{c(i)} == 0 \\ 3, & (h_{c(i)} == 1 \text{ and } v_{c(i)} == 0) \text{ or } (h_{c(i)} == 0 \text{ and } v_{c(i)} == 1) \\ 5, & h_{c(i)} == 1 \text{ and } v_{c(i)} == 1 \end{cases}$$

Also, in some embodiments, the position of each virtual loudspeaker $P_{SP_{n,i}}$ in $i^{th}$ frame may be formulated as below:

$$(h_{c(i)} == 0 \text{ and } v_{c(i)} == 0) \rightarrow \quad \text{(Figure 9A)}$$

$$\{P_{SP_{1,i}}(x, y, z) = centerpoint(x, y, z)$$

$$(h_{c(i)} == 1 \text{ and } v_{c(i)} == 0) \rightarrow \quad \text{(Figure 9B)}$$

$$\begin{cases} P_{SP_{1,i}}(x, y, z) = centerpoint(x, y, z) \\ P_{SP_{2,i}}(x, y, z) = leftpoint(x, y, z) \\ P_{SP_{3,i}}(x, y, z) = rightpoint(x, y, z) \end{cases}$$

$$(h_{c(i)} == 0 \text{ and } v_{c(i)} == 1) \rightarrow \quad \text{(Figure 9C)}$$

$$\begin{cases} P_{SP_{1,i}}(x, y, z) = centerpoint(x, y, z) \\ P_{SP_{2,i}}(x, y, z) = toppoint(x, y, z) \\ P_{SP_{3,i}}(x, y, z) = bottompoint(x, y, z) \end{cases}$$

$$(h_{c(i)} == 1 \text{ and } v_{c(i)} == 1) \rightarrow \begin{cases} P_{SP_{1,i}}(x, y, z) = centerpoint(x, y, z) \\ P_{SP_{2,i}}(x, y, z) = bottomleftpoint(x, y, z) \\ P_{SP_{3,i}}(x, y, z) = bottomrightpoint(x, y, z) \\ P_{SP_{4,i}}(x, y, z) = topleftpoint(x, y, z) \\ P_{SP_{5,i}}(x, y, z) = toprightpoint(x, y, z) \end{cases}$$

where $P_{SP_{1,i}}$(x, y, z) is the position of the virtual loudspeaker 942, $P_{SP_{2,i}}$(x, y, z) is the position of the virtual loudspeaker

944, $P_{SP_{3,i}}$(x, y, z) is the position of the virtual loudspeaker 946, $P_{SP_{4,i}}$(x, y, z) is the position of the virtual loudspeaker 947, and $P_{SP_{5,i}}$(x, y, z) is the position of the virtual loudspeaker 948.

centerpoint(x, y, z) is the position of the center point of the (point/1D/2D) representation 902, 904, 906, or 908 of the audio element 102, leftpoint(x, y, z) is the position of the left corner of the 1D representation 904, rightpoint(x, y, z) is the position of the right corner of the 1D representation 904, toppoint(x, y, z) is the position of the top corner of the 1D representation 906, and bottompoint(x, y, z) is the position of the bottom corner of the 1D representation 906. bottomleftpoint(x, y, z) is the position of the bottom left corner of the 2D representation 908, bottomrightpoint(x, y, z) is the position of the bottom right corner of the 2D representation 908, topleftpoint(x, y, z) is the position of the top left corner of the 2D representation 908, and toprightpoint(x, y, z) is the position of the top right corner of the 2D representation 908.

The gain adjustment of each virtual loudspeaker may be determined using the equation (1) discussed above.

Figure 9A:
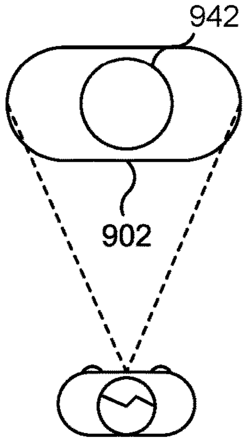
FIGS. 9A-9D show different representations of an audio element according to some embodiments.
Figure 9B:
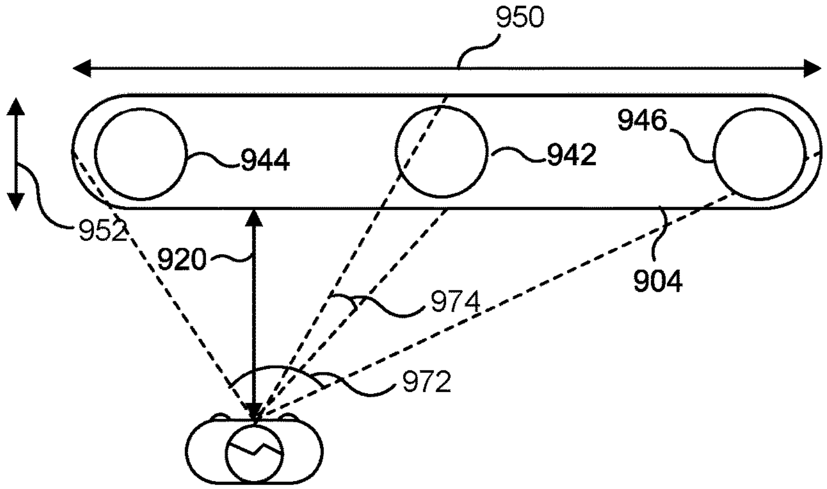
Figure 9C:
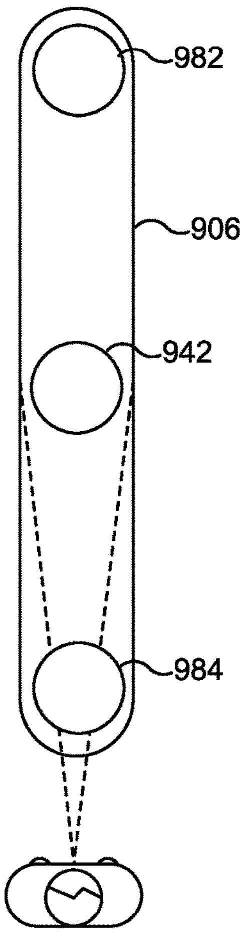

The 2D representation of the audio element 102 may be made by combining the 1D representation 904 shown in FIG. 9B and the 1D representation 906 shown in FIG. 9C. However, experiments showed that spatial cues are preserved better when 4 out of 5 virtual loudspeakers are located in the corners of the 2D representation as shown in FIG. 9D.

As discussed above, the number and/or the positions of virtual loudspeakers to use for rendering the audio element 102 may vary based on the size of the representation of the audio element 102 and/or a distance between the audio element 102 and the listener 104.

However, a sudden change in the number and/or the positions of the virtual loudspeakers may result in an undesirable artifact in the audio signal output for rendering the audio element. To reduce and/or prevent such undesirable artifact, it is desirable to provide a smooth transition from one virtual loudspeaker setup (that is associated with a particular number and particular positions of the virtual loudspeakers) to another virtual loudspeaker setup (that is associated with a different number and/or different positions of the virtual loudspeakers). Some embodiments of this disclosure provide a way to achieve a smooth transition between the different virtual loudspeaker setups.

Figure 9D:
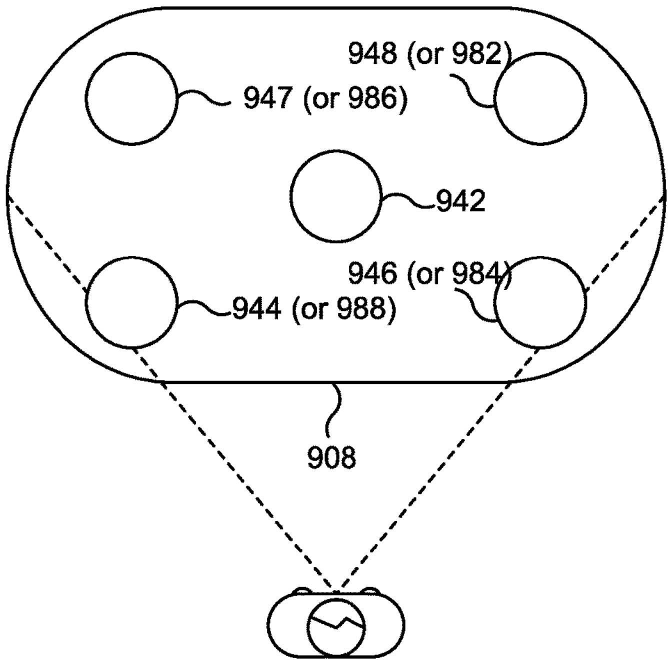

FIGS. 9A-9D show different representations of the audio element 102 according to some embodiments. The representation 902 shown in FIG. 9A is a point representation. The representation 904 or 906 shown in FIG. 9B or 9C is a 1D representation. The representation 908 shown in FIG. 9D is a 2D representation.

A transition from the point representation 902 to the 1D representation 904 or 906 and a transition from the 1D representation 904 or 906 to the 2D representation 908 may be achieved by either transition scheme #1—transitioning from the point representation 902 to the 1D representation 904 ("1D horizontal representation") and then to the 2D representation 908—or transition scheme #2—transitioning from the point representation 902 to the 1D representation 906 ("1D vertical representation") and then to the 2D representation 908.

Thus, in some embodiments, appropriate transition scheme for switching the representation of the audio element may be selected from the two transition schemes based on the width angle (e.g., 706 shown in FIG. 7B) and the height angle (e.g., 704 shown in FIG. 7A) associated with the audio element 102 and the listener 104.

For example, in the VR environment 100 shown in FIG. 1, as the listener 104 moves closer to the audio element 102 in a particular direction, there may be a scenario where the width angle (706) changes at a rate faster than the rate at which the height angle (704) changes, and thus, the width angle (706) will pass a width threshold before the height angle (704) passes a height threshold. In such scenario, the transition scheme #1—transitioning from the point representation 902 to the 2D representation 908 via the 1D horizontal representation 904—may be applied. The width threshold and the height threshold may be the same or different.

On the other hand, if the listener 104 moves closer to the audio element 102 in a particular direction, there may be a scenario where the height angle (704) changes at a rate faster than the rate at which the width angle (706) changes, and thus, the height angle (704) will pass a threshold before the width angle (706) angle passes the threshold. In such scenario, the transition scheme #2—transitioning from the point representation 902 to the 2D representation 908 via the 1D vertical representation 906—may be applied.

There may also be a rare scenario where as the listener 104 moves closer to the audio element 102, the height angle 704 and the width angle 706 are changed at the same rate, and thus the height angle 704 and the width angle 706 pass the threshold at substantially the same time. In such scenario, both methods are applicable.

Once the transition scheme is selected, the selected transition scheme is continuously applied regardless of whether there is a change as to which one of the height angle and the width angle changes faster as long as the current height angle and the current width angle are continued to be greater than or equal to a respective threshold. For example, because the rate of the width angle change is higher than the rate of the height angle change, the transition scheme #1 may be selected at time t=t0. But there may be a scenario where at time t=t1, the rate of the height angle change becomes greater than the rate of the width angle change. In such scenario, according to one embodiment, the transition scheme #1 is continuously applied as long as the current height angle and the current width angle continue to be greater than or equal to a respective threshold.

On the other hand, if, after time t=t0, if a distance between the audio element 102 and the listener 104 is increased such that at time t=t1, the width angle is less than a width angle threshold and the height angle is less than a height angle threshold, then the transition scheme selected at time t=t0 is no longer applicable, and a new transition scheme will be selected according to the method described above.

In scenarios where the width (e.g., 950 shown in FIG. 9B) of the representation of the audio element 102 is larger than or equal to the height (e.g., 952 shown in FIG. 9B) of the representation of the audio element 102, as the audio element 102 and the listener 104 become closer to each other, thereby reducing distance (e.g., 920 shown in FIG. 9B) between the audio element 102 and the listener 104, the width angle (e.g., 972 shown in FIG. 9B) increases at a rate that is faster than or equal to the rate at which the height angle (e.g., 974 shown in FIG. 9B) increases, and thus sin(α) increases at a rate that is faster than or equal to the rate at which sin(β) increases. Note that $$\alpha = \frac{\text{the width angle}}{2} \text{ and } \beta = \frac{\text{the height angle}}{2}.$$

In such scenarios, if the initial representation of the audio element 102 was a point representation (e.g., 902 shown in FIG. 9A), as the audio element 102 and the listener 104 become closer to each other, the number of virtual loudspeakers to use for rending the audio element 102 may increase from one virtual loudspeaker to three virtual loudspeakers arranged horizontally (i.e., transitioning from the point representation 902 to the 1D representation 904).

More specifically, as shown in FIG. 9A, when the audio element 102 is represented as the point source 902, only one virtual loudspeaker positioned at the center of the representation 902 may be used to represent the audio element 102. On the other hand, as shown in FIG. 9B, when the audio element 102 is represented using the 1D representation 904, three virtual loudspeakers arranged in a line may be used to represent the audio element 102.

In some embodiments, one way to increase the number of virtual loudspeakers to use for rendering the audio element 102 from one to three is by maintaining the virtual speaker (e.g., 942 shown in FIG. 9A) that existed in the point representation (e.g., 902 shown in FIG. 9A) and adding two virtual loudspeakers 944 and 946 at the left and right sides of the 1D representation 904. That is: $P_{SP_{2,i}}$(x, y, z)=leftpoint (x, y, z) and $P_{SP_{3,i}}$(x, y, z)=rightpoint(x, y, z), where $P_{SP_{2,i}}$(x, y, z) is the position of the newly added virtual speaker 944 and $P_{SP_{3,i}}$(x, y, z) is the position of the newly added virtual speaker 946. leftpoint(x, y, z) is the left corner position of the 1D representation 904 and rightpoint(x, y, z) is the right corner position of the 1D representation 904.

In order to make a smooth transition from the point representation 902 to 1D horizontal representation 904, the gain of each of the newly added virtual loudspeakers 944 and 946 may be increased gradually. For example, in some embodiments, the gain of each of the newly added virtual loudspeakers 944 and 946 may be determined based on the width angle 972. For example, $$SG_{2,i} = f(\alpha) * SG_{2,i}^0 \text{ and } SG_{3,i} = f(\alpha) * SG_{3,i}^0,$$

where $SG_{2,i}$ is the adjusted gain of the virtual loudspeaker 944 and $SG_{3,i}$ is the adjusted gain of the virtual loudspeaker 946.

$$SG_{2,i}^0 \text{ and } SG_{3,i}^0$$

are default gains and may be predefined. In some embodiments, the default gains may be 1. ƒ(α) is a gain adjustment factor which may vary between 0 and 1 (i.e., ƒ(α)∈[0,1]) based on α∈[0, π/2]. Note that $$\alpha = \frac{\text{width angle}}{2}.$$

In some embodiments, ƒ(α) may be set to be a constant value if α is less than a start threshold angle value ($\alpha_{st}$) but starts to increase (e.g., linearly, exponentially, etc) from the constant value if α increases. When α becomes an end threshold angle value ($\alpha_{end}$), ƒ(α) may be set to be another constant value. For example, $$f(\alpha)=\begin{cases}0, & \alpha<\alpha_{st}\\ (0,1], & \alpha_{st}\le\alpha\le\alpha_{end}\\ 1, & \alpha>\alpha_{end}\end{cases}$$

$\alpha_{st}$ and $\alpha_{end}$ may be adjustable between 0 to 90 degrees but may always need to satisfy the condition of $\alpha_{st}<\alpha_{end}$.

Figure 10:
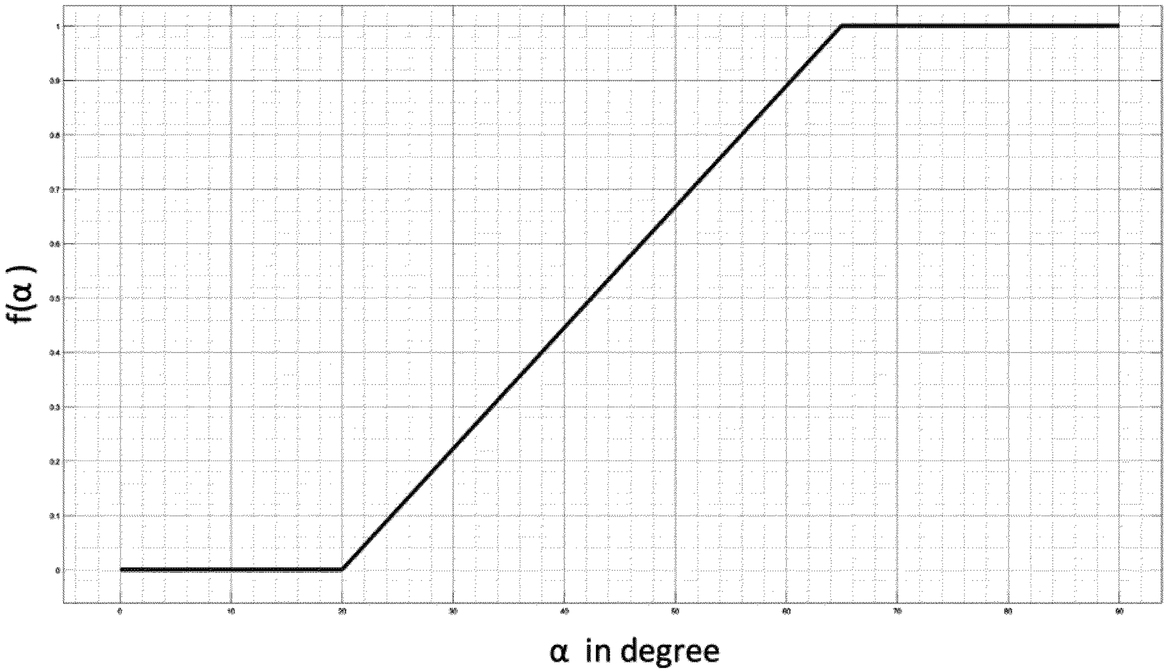
FIG. 10 shows an example of gain adjustment according to some embodiments.

FIG. 10 is an example of gain adjustment where $f(\alpha)$ linearly increases from $\alpha=20$ to $\alpha=65$.

In other embodiments, gain adjustment factor $f(\alpha)$ may also be a trigonometric function of $\alpha$. For example, $f(\alpha)=k*\sin(\alpha)$, where k is a constant controlling the pace of the transition.

After the representation of the audio source 102 is transitioned from the point source representation 902 to the 1D horizontal representation 904, there may be a scenario where the height angle 974 becomes greater. As the height angle 974 becomes greater, $\beta$ (which is equal to $$\frac{\text{the height angle}}{2}\Bigg)$$

becomes greater, thereby becoming more significant. Once $\beta$ becomes sufficiently significant, the representation of the audio element 102 may further be transitioned from the 1D horizontal representation 904 to the 2D representation 908.

The transition from the 1D horizontal representation 904 to the 2D representation 908 may begin by determining the boundary of the 2D representation 908 of the audio element 102. After determining the boundary of the 2D representation 908, two new virtual loudspeakers 947 and 948 may be added to the top left corner and the top right corner of the 2D representation 908.

Also the two virtual loudspeakers 944 and 946 that existed in the 1D horizontal representation 904 may be moved from their initial positions in the 1D horizontal representation 904 towards the bottom left corner and the bottom right corner of the 2D representation 908.

That is:

$$P_{SP_{4,i}}(x,y,z)=topleftpoint(x,y,z)$$

$$P_{SP_{5,i}}(x,y,z)=toprightpoint(x,y,z)$$

$$P_{SP_{2,i}}(x,y,z)=\sin(\beta)*bottomleftpoint(x,y,z)+(1-\sin(\beta))*leftedgepoint(x,y,z)$$

$$P_{SP_{3,i}}(x,y,z)=\sin(\beta)*bottomrightpoint(x,y,z)+(1-\sin(\beta))*rightedgepoint(x,y,z)$$

where $P_{SP_{4,i}}(x, y, z)$ is the position of the newly added virtual loudspeaker 947, $P_{SP_{5,i}}(x, y, z)$ is the position of the newly added virtual loudspeaker 948, topleftpoint(x, y, z) is the position of the top left corner of the 2D representation 908, and toprightpoint(x, y, z) is the position of the top right corner of the 2D representation 908.

$P_{SP_{2,i}}(x, y, z)$ is the position of the existing virtual loudspeaker 944, $P_{SP_{3,i}}(x, y, z)$ is the position of the existing virtual loudspeaker 946, bottomleftpoint(x, y, z) is the position of the bottom left corner of the 2D representation 908, leftedgepoint(x, y, z) is the center point of the left side of the 2D representation 908 (i.e., the left edge point is the middle point between the left top point and the left bottom point), bottomrightpoint(x, y, z) is the position of the bottom right corner of the 2D representation 908, and rightedgepoint(x, y, z) is the center point of the right side of the 2D representation 908 (i.e., the right edge point is the middle point between the right top point and the right bottom point). Here, instead of $\sin(\beta)$, a different function $f(\beta)$ may be used. $f(\beta)$ may be set to be a constant value if $\beta$ is less than a start threshold angle value ($\beta_{st}$) but starts to increase (e.g., linearly, exponentially, etc) from the constant value if $\beta$ increases. When $\beta$ becomes an end threshold angle value ($\beta_{end}$), $f(\beta)$ may be set to be another constant value. For example, $$f(\beta)=\begin{cases}0, & \beta<\beta_{st}\\ (0,1], & \beta_{st}\le\beta\le\beta_{end}\\ 1, & \beta>\beta_{end}\end{cases}$$

$\beta_{st}$ and $\beta_{end}$ may be adjustable between 0 to 90 degrees but may always need to satisfy the condition of $\beta_{st}<\beta_{end}$.

When transitioning from the 1D representation 904 to the 2D representation 908, initially, when the height angle 974 is substantially low, the position of the virtual loudspeaker 944 and 946 remains the same with respect the position of the virtual loudspeaker 942. However, as the height of the representation of the audio element 102 increases, the position of the virtual loudspeaker 944 moves toward the bottom left corner of the 2D representation 908. Similarly, as the height of the representation of the audio element 102 increases, the position of the virtual loudspeaker 946 moves toward the bottom right corner of the 2D representation 908.

Figure 11:
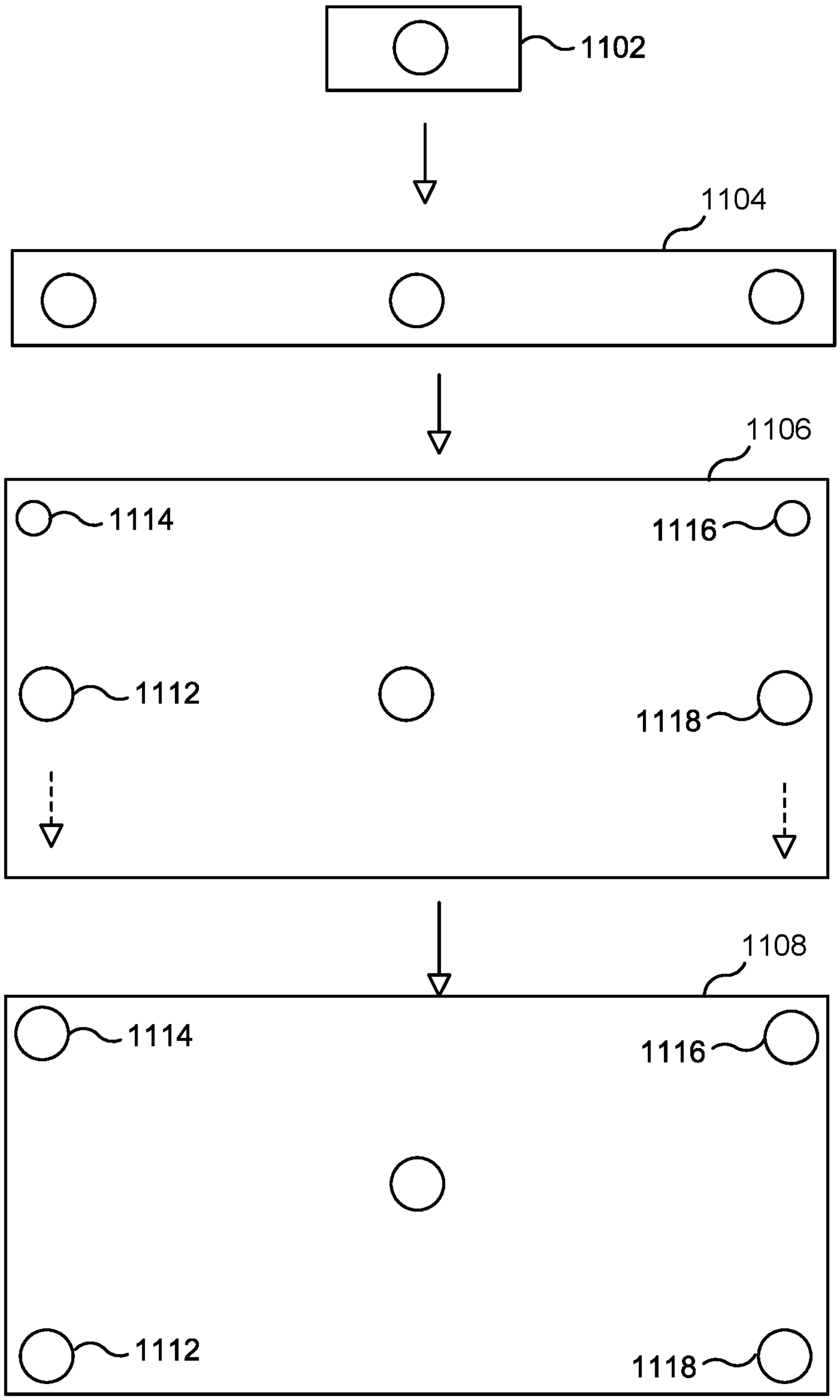
FIG. 11 shows a transition process of the representation of an audio element according to some embodiments.

FIG. 11 shows a transition from a point source representation 1102 to a 2D representation 1108 via a 1D representation 1104 and an intermediate 2D representation 1106 according to some embodiments. To make the transition smooth, the above discussed gain adjustment method (the gain adjustment method used for the transition from the point representation to the 1D representation) may be used here. For example, for the transition from the 1D representation 1104 to the intermediate 2D representation 1106, the gain adjustment for the two newly added virtual loudspeakers 1114 and 1116 may be determined based on the height angle as follows:

$$SG_{4,i}=g(\beta)*SG_{4,i}^{0}$$

$$SG_{5,i}=g(\beta)*SG_{5,i}^{0}$$

$$\text{where } \beta=\frac{\text{the height angle}}{2}$$

and $g(\beta)$ is a gain adjustment factor function which varies between 0 and 0.5 ($g(\beta)\in[0,0.5]$) based on $\beta\in[0, \pi/2]$.

$SG_{4,i}$ and $SG_{5,i}$ are the gains of the newly added virtual loudspeakers 1114 and 1116 respectively.

$$SG_{4,i}^{0} \text{ and } SG_{5,i}^{0}$$

are default gains that may be predefined.

The gain adjustment factor function $g(\beta)$ may cause the gain change to occur at a particular height (elevation) angle. That is, at $\beta=\beta_{st}$, $g(\beta)$ starts to increase (e.g., linearly, exponentially, etc.) from 0 and at $\beta=\beta_{end}$, $g(\beta)$ reaches 0.5:

$$g(\beta)=\begin{cases}0, & \beta<\beta_{st}\\ (0,0.5], & \beta_{st}\le\beta\le\beta_{end}\\ 0.5, & \beta>\beta_{end}\end{cases}$$

Also, to preserve the stability of the overall gain of all virtual loudspeakers, as the gains of the two new virtual loudspeakers 1114 and 1116 increase (e.g., during the transition from the intermediate 2D representation 1106 to the 2D representation 1108), the gains of the two virtual loudspeakers that existed in the 1D representation 1104—the virtual loudspeakers 1112 and 1118—may be attenuated gradually using:

$$SG_{2,i}=(1-g(\beta))*SG^0_{2,i}$$

$$SG_{3,i}=(1-g(\beta))*SG^0_{3,i}$$

where $SG_{2,i}$ and $SG_{3,i}$ are the gains of the existing virtual loudspeakers 1112 and 1118 respectively.

$$SG^0_{2,i} \text{ and } SG^0_{3,i}$$

are default gains that may be predefined.

As discussed above, this gain adjustment method may be a complementary step and does not undermine the necessity of further gain adjustments in other steps of the renderer.

In scenarios where the height of the audio element is greater than or equal to the width of the audio element (i.e., width<height or width=height), the transition from the point representation (e.g., 902 shown in FIG. 9A) of the audio element 102 to the 2D representation (e.g., 908 shown in FIG. 9D) may be performed by transitioning from the point representation (e.g., 902 shown in FIG. 9A) to the 1D vertical representation (e.g., 906 shown in FIG. 9C) and then from the 1D vertical representation (e.g., 906 shown in FIG. 9C) to the 2D representation (e.g., 908 shown in FIG. 9D).

That is, for the transition from the point representation 902 to the 1D vertical representation 906, the position of the two newly added virtual loudspeakers 982 and 984 may be set as follows:

$$P_{SP_{2,i}}(x,y,z)=toppoint(x,y,z)$$

$$P_{SP_{3,i}}(x,y,z)=bottompoint(x,y,z)$$

where $P_{SP_{2,i}}(x, y, z)$ is the position of the newly added virtual loudspeaker 982, $P_{SP_{3,i}}(x, y, z)$ is the position of the newly added virtual loudspeaker 984, toppoint(x, y, z) is the position of the top corner of the 2D representation 906, and bottompoint(x, y, z) is the position of the bottom corner of the 2D representation 906.

To make the transition from the point representation 902 to the 1D vertical representation 906 smooth, the gain of the newly added virtual loudspeakers 982 and 984 may gradually increase. This gain adjustment of the virtual loudspeakers 982 and 984 may be determined based on the height (elevation) angle:

$$SG_{2,i}=f(\beta)*SG^0_{2,i}$$

-continued $$SG_{3,i}=f(\beta)*SG^0_{3,i}$$

where $f(\beta)$ is a gain adjustment factor which varies between 0 and 1 ($f(\beta)\in[0,1]$) based on $\beta\in[0, \pi/2]$, $$SG^0_{2,i}$$

is the default gain of the virtual loudspeaker 982, and $$SG^0_{3,i}$$

is the default gain of the virtual loudspeaker 984.

The gain adjustment factor function $f(\beta)$ may cause the gain change to occur at a particular height (elevation) angle. That is, at $\beta=\beta_{st}$, $f(\beta)$ starts to increase (e.g., linearly, exponentially, etc.) from 0 and at $\beta=\beta_{end}$, $f(\beta)$ reaches 1:

$$f(\beta)=\begin{cases}0, & \beta<\beta_{st}\\ (0,1], & \beta_{st}\le\beta\le\beta_{end}\\ 1, & \beta>\beta_{end}\end{cases}$$

$\beta_{st}$ and $\beta_{end}$ can vary between 0 to 90 degrees with the condition of $\beta_{st}<\beta_{end}$.

As $\alpha$ becomes significant, the transition from the 1D representation 906 to the 2D representation 908 may begin to occur by adding two virtual loudspeakers 986 and 988 at the top left and bottom left corners of the 2D representation 908 and moving the two already added virtual loudspeakers 982 and 984 from the initial positions towards the top right and bottom right corners of the 2D representation 908 respectively. That is:

$$P_{SP_{4,i}}(x,y,z)=topleftpoint(x,y,z)$$

$$P_{SP_{5,i}}(x,y,z)=bottomleftpoint(x,y,z)$$

$$P_{SP_{2,i}}(x,y,z)=\sin(\alpha)*toprightpoint(x,y,z)+(1-\sin(\alpha))*toppoint(x,y,z)$$

$$P_{SP_{3,i}}(x,y,z)=\sin(\alpha)*bottomrightpoint(x,y,z)+(1-\sin(\alpha))*bottompoint(x,y,z)$$

where $P_{SP_{4,i}}(x, y, z)$ is the position of the newly added virtual loudspeaker 986, $P_{SP_{5,i}}(x, y, z)$ is the position of the newly added virtual loudspeaker 988, topleftpoint(x, y, z) is the position of the top left corner of the 2D representation 908, and toprightpoint(x, y, z) is the position of the top right corner of the 2D representation 908. As explained above, sin(α) is provided as an example function. Instead of sin(α), any general function $f(\alpha)$ described above may be used.

$P_{SP_{2,i}}(x, y, z)$ is the position of the existing virtual loudspeaker 982, $P_{SP_{3,i}}(x, y, z)$ is the position of the existing virtual loudspeaker 984, toprightpoint(x, y, z) is the position of the top right corner of the 2D representation 908, bottomrightpoint(x, y, z) is the position of the bottom right corner of the 2D representation 908.

Figure 12:
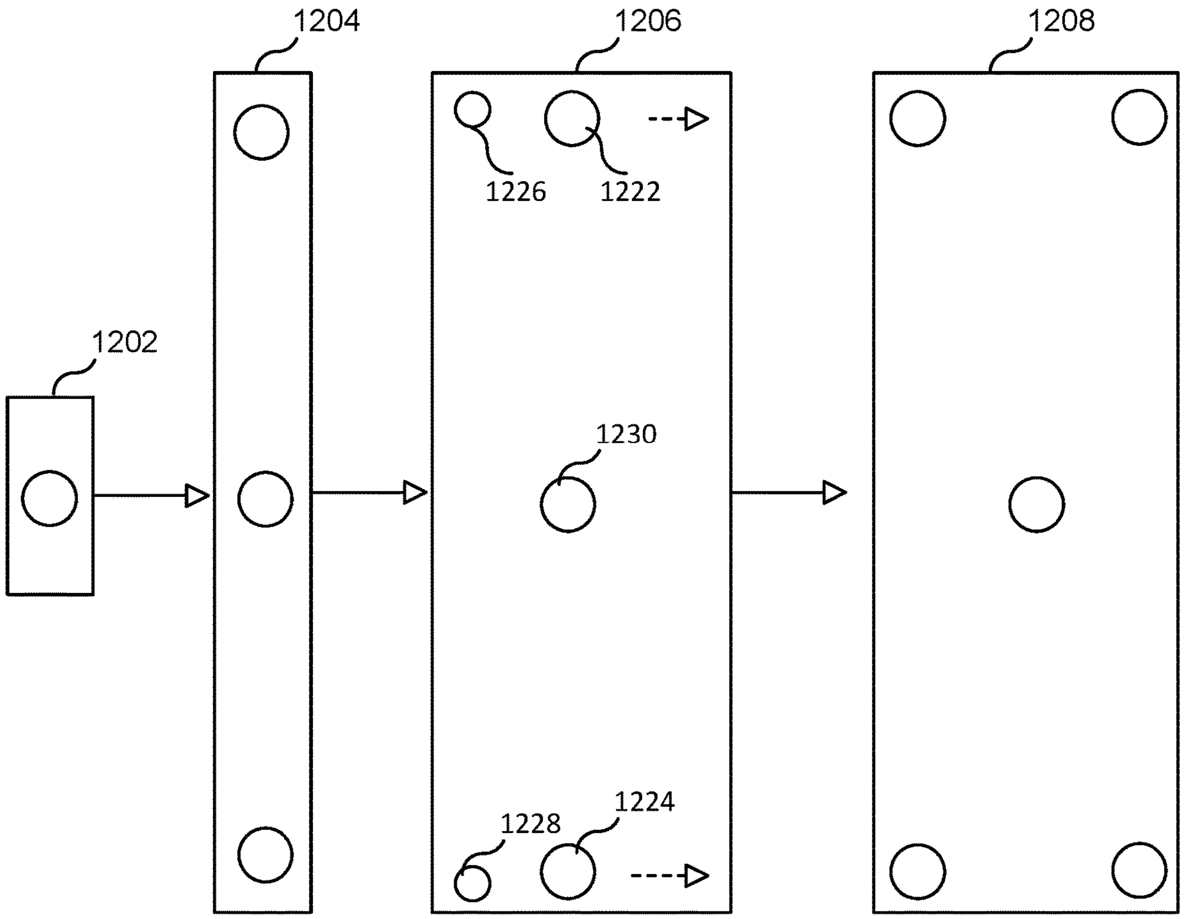
FIG. 12 shows a transition process of the representation of an audio element according to some embodiments.

FIG. 12 shows a transition from the point representation 1202 to the 2D representation 1208. The transition may comprise a transition from the point representation 1202 to the 1D representation 1204 and a transition from the 1D representation 1204 to the 2D representation 1208 via the 2D intermediate representation 1206. Like the embodiment shown in FIG. 11, to smooth the transition from the 1D representation 1204 to the 2D representation 1208, the gain of the virtual loudspeakers used for rendering the audio element 102 may be adjusted gradually. For example, the gain of each of the virtual loudspeakers 1226 and 1228 that are newly added to create the 2D representation 1208 may be adjusted based on a that depends on the width angle (a). In some embodiments, α may be equal to a/2.

In one example, the gain of each of the virtual loudspeakers 1226 and 1228 may be set as follows:

$$SG_{4,i} = g(\alpha) * SG^0_{4,i}$$

$$SG_{5,i} = g(\alpha) * SG^0_{5,i}$$

where g(α) is a gain adjustment factor which may vary between 0 and 0.5 (g(α)∈[0,0.5]) based on $$\alpha \in \left[0, \frac{\pi}{2}\right], SG^0_{4,i}$$

is the default gain of the virtual loudspeaker 1226, and $$SG^0_{5,i}$$

is the default gain of the virtual loudspeaker 1228.

An example function for the gain adjustment factor g(α) is shown below:

$$g(\alpha) = \begin{cases} 0, & \alpha < \alpha_{st} \\ (0, 0.5], & \alpha_{st} \le \alpha \le \alpha_{end} \\ 0.5, & \alpha > \alpha_{end} \end{cases}$$

As shown above, the gain adjustment factor remains to be 0 until α reaches a lower threshold value $\alpha_{st}$. In other words, the gain adjustment factor remains to be 0 until the width angle reaches a certain threshold angle. Once the width angle reaches the threshold angle, and thus α reaches the lower threshold value $\alpha_{st}$, g(α) starts to increase (e.g., linearly, exponentially, etc.) from 0 to 0.5 as α increases from the lower threshold value $\alpha_{st}$ to a higher threshold value $\alpha_{end}$. Once α reaches the higher threshold value $\alpha_{end}$, g(α) is set to be 0.5 regardless of whether α further increases beyond the higher threshold value $\alpha_{end}$.

As shown in FIG. 12, in the intermediate 2D representation 1206, five virtual loudspeakers 1222, 1224, 1226, 1228, and 1230 are used for rendering the audio element 102. However, if the gain of each of the virtual loudspeakers 1226 and 1228 increases without adjusting the gain of the remaining virtual loudspeakers, the overall gain of the combination of the virtual loudspeakers maybe increased unproportionally.

In order to preserve the stability of the overall gain of all virtual loudspeakers, as the gain of the virtual loudspeakers 1226 and 1228 increases, the gain of the pre-existing two virtual loudspeakers 1222 and 1224 may be attenuated gradually using:

$$SG_{2,i} = (1 - g(\alpha)) * SG^0_{2,i}$$

$$SG_{3,i} = (1 - g(\alpha)) * SG^0_{3,i}$$

where $SG_{2,i}$ is the gain of the virtual loudspeaker 1222 and $SG_{3,i}$ is the gain of the virtual loudspeaker 1224. Similarly, $$SG^0_{2,i}$$

is the default gain of the virtual loudspeaker 1222 and $$SG^0_{3,i}$$

is the default gain of the virtual loudspeaker 1224. The default gains may be predetermined.

The transition methods explained above is not limited to perform the transition from the point representation 1202 to the 1D representation 1204 and then from the 1D representation 1204 to the 2D representation 1208. The transition methods explained above are also applicable to the scenario where during the transition from the point representation to the 1D horizontal representation, the transition from the 1D horizontal representation to the 2D representation starts.

Figure 13:
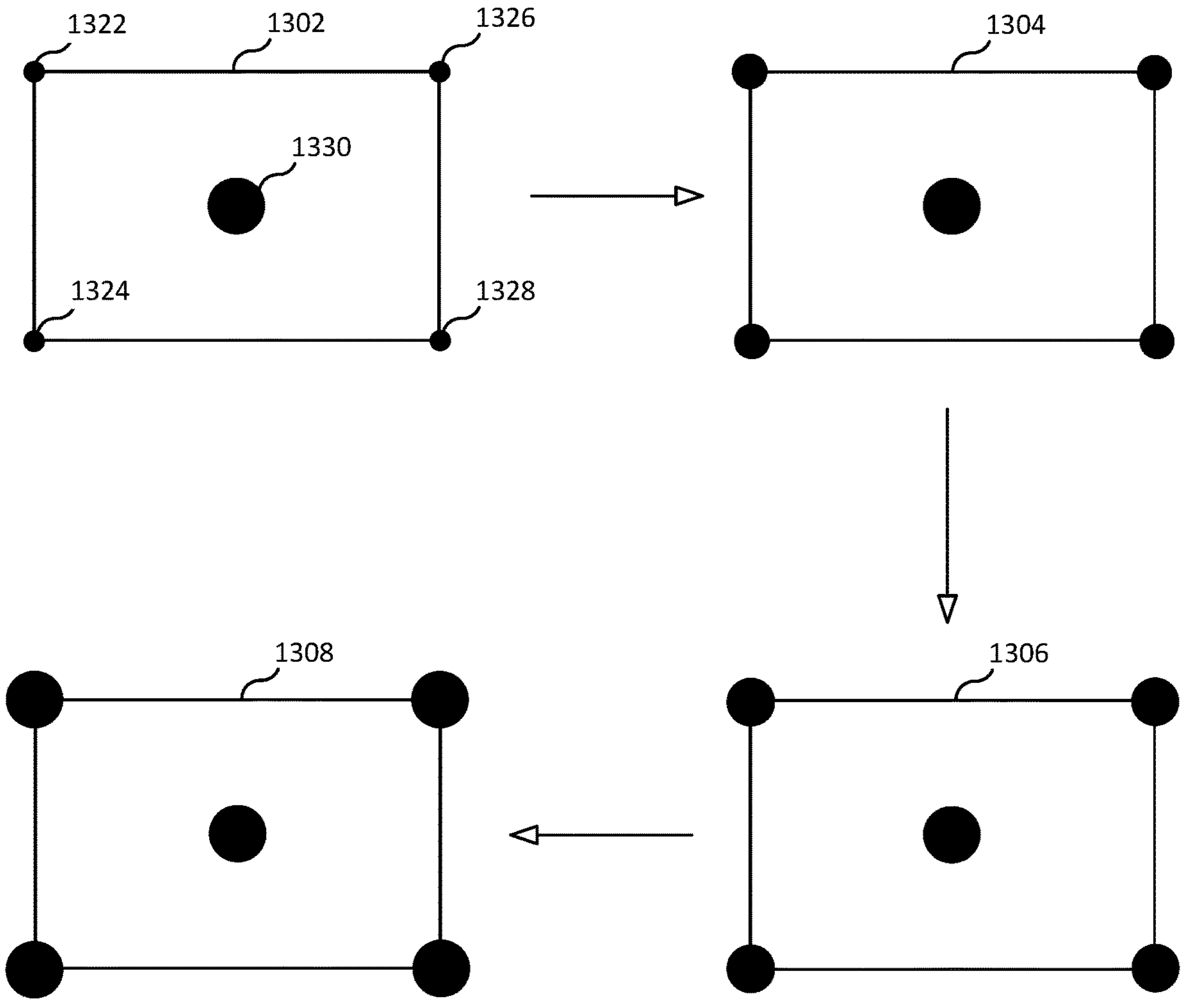
FIG. 13 shows an example virtual loudspeaker setup according to some embodiments.

FIG. 13 shows an alternative method of switching the representation of the audio element 102 according to some embodiments. In the embodiments shown in FIG. 13, the representation of the audio element 102 is switched from the point representation 1302 to the 2D representation directly (i.e., without going through switching to the 1D representation). More specifically, in the embodiments shown in FIG. 13, the representation of the audio element 102 is switched from the point source representation 1302 to the 2D representation 1308 via first intermediate 2D representation 1304 and second intermediate 2D representation 1306.

In the embodiments shown in FIG. 13, like the 2D representation 1308 of the audio element 102, the point representation 1302 is two-dimensional with five virtual speakers—1322, 1324, 1326, 1328, and 1330. The virtual loudspeaker 1330 may be located in the center of the 2D representation 1308 while the remaining four virtual loudspeakers are located at the boundary of the 2D representation 1308. For example, the positions of the virtual loudspeakers 1322, 1324, 1326, and 1328 may be defined as follows:

$$P_{SP_{2,i}}(x, y, z) = topleftpoint(x, y, z)$$

$$P_{SP_{3,i}}(x, y, z) = bottomleftpoint(x, y, z)$$

$$P_{SP_{4,i}}(x, y, z) = toprightpoint(x, y, z)$$

$$P_{SP_{5,i}}(x, y) = bottomrightpoint(x, y, z)$$

where $P_{SP_{2,i}}(x, y, z)$ is the position of the virtual loudspeaker 1322, $P_{SP_{3,i}}(x, y, z)$ is the position of the virtual loudspeaker 1324, $P_{SP_{4,i}}(x, y, z)$ is the position of the virtual loudspeaker 1326, and $P_{SP_{5,i}}(x, y, z)$ is the position of the virtual loudspeaker 1328.

Also as shown in FIG. 13, topleftpoint(x, y, z) is the position of the top left corner of the 2D representation 1308, bottomleftpoint(x, y, z) is the position of the bottom left corner of the 2D representation 1308, toprightpoint(x, y, z) is the position of the top right corner of the 2D representation 1308, and bottomrightpoint(x, y, z) is the position of the bottom right corner of the 2D representation 1308.

The number of virtual loudspeakers shown in FIG. 13 is provided for illustration purpose only and do not limit the embodiments of this disclosure in any way.

The point representation 1302 of the audio element 102 may be achieved by setting the gain of each of the virtual loudspeakers 1322, 1324, 1326, and 1328 low while setting the gain of the center virtual loudspeaker 1330 high relative to the gain of the remaining loudspeakers. For example, the gain of each of the virtual loudspeakers 1322, 1324, 1326, and 1328 may be set to zero or close to zero. By setting the gain of the center virtual speaker 1330 high while setting the gain of the remaining four loudspeakers low, the audio element 102 will be perceived by the listener as a point source.

In order to switch from the point representation 1302 to the 2D representation 1308, there is no need to change the number of the virtual loudspeakers because the point source representation 1302 of the audio element 102 includes the number of virtual loudspeakers (e.g., in FIG. 12, the number of virtual loudspeakers is 5) needed to represent the 2D representation 1308.

Thus, only the gain of each of the virtual loudspeakers need to be adjusted to switch the representation of the audio element 102 from the point representation 1302 to the 2D representation 1308. However, increasing the gain of each of the virtual loudspeakers 1324, 1324, 1326, and 1328 suddenly to create the 2D representation 1308 may result in an undesirable artifact in the audio signal output for rendering the audio element 102. Thus, to smooth the transition from the point source representation 1302 to the 2D representation 1308, the gain of each of the virtual loudspeakers 1322, 1324, 1326, and 1328 may be increased gradually, thereby going through the first and second intermediate representations 1304 and 1306.

In some embodiments, the degree of adjusting the gains may depend on the width (azimuth) angle 706 and the height (elevation) angle 704 (e.g., linearly, exponentially or trigonometrically). For example, $$SG_{2,i} = r * \sin(\alpha) * \sin(\beta) * SG^0_{2,i}$$

$$SG_{3,i} = r * \sin(\alpha) * \sin(\beta) * SG^0_{3,i}$$

$$SG_{4,i} = r * \sin(\alpha) * \sin(\beta) * SG^0_{4,i}$$

$$SG_{5,i} = r * \sin(\alpha) * \sin(\beta) * SG^0_{5,i}$$

where $SG_{2,i}$ is the gain of the virtual loudspeaker 1322, $SG_{3,i}$ is the gain of the virtual loudspeaker 1324, $SG_{4,i}$ is the gain of the virtual loudspeaker 1326, $SG_{5,i}$ is the gain of the virtual loudspeaker 1328, $$SG^0_{2,i}$$

is the default gain of the virtual loudspeaker 1322, $$SG^0_{3,i}$$

is the default gain of the virtual loudspeaker 1324, $$SG^0_{4,i}$$

is the default gain of the virtual loudspeaker 1326, and $$SG^0_{5,i}$$

is the default gain of the virtual loudspeaker 1328.

As explained above, $$\alpha = \frac{\text{width angle}}{2} \text{ and } \beta = \frac{\text{height angle}}{2}.$$

Also, r is a constant that controls the transition rate (i.e., how fast or slow the transition from the point representation 1302 to the 2D representation 1308 occurs). In one example, r may be set such that 0 r*sin(α)*sin(β)≤1.

Even though FIG. 13 only shows transitioning from the point representation 1302 to the 2D representation 1308, transitioning from the 2D representation 1308 to the point representation 1302 can be achieved using the same method (i.e., by controlling the gain of each of the virtual loudspeakers).

Figure 14:
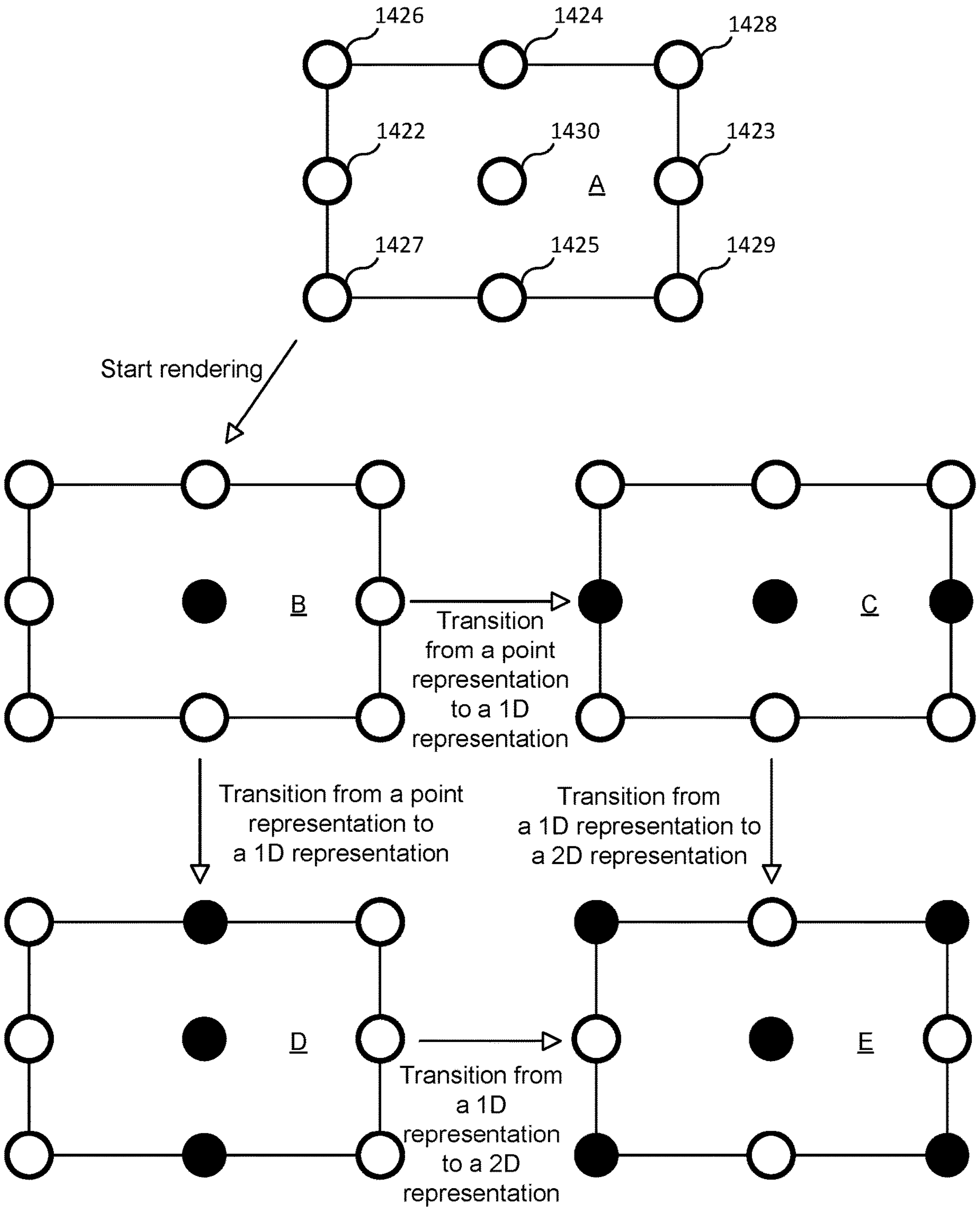
FIG. 14 shows an example virtual loudspeaker setup according to some embodiments.

In another alternative embodiment, the transition from the point representation to the 2D representation may be made using nine virtual loudspeakers—1422, 1423, 1424, 1425, 1426, 1427, 1428, 1429, 1430—as shown in FIG. 14. By fading-in and/or fading-out the audio effect of the nine virtual loudspeakers through adjusting their gains, the representation of the audio element 102 may be switched between the point source representation and the 2D representation. In one example, the positions of each of the nine virtual loudspeakers may be mathematically expressed as follows:

$$P_{SP_{1,i}}(x, y, z) = centerpoint(x, y, z)$$

$$P_{SP_{2,i}}(x, y, z) = leftedgepoint(x, y, z)$$

$$P_{SP_{3,i}}(x, y, z) = rightedgepoint(x, y, z)$$

$$P_{SP_{4,i}}(x, y, z) = topedgepoint(x, y, z)$$

$$P_{SP_{5,i}}(x, y, z) = bottomedgepoint(x, y, z)$$

$$P_{SP_{6,i}}(x, y, z) = topleftpoint(x, y, z)$$

$$P_{SP_{7,i}}(x, y, z) = bottomleftpoint(x, y, z)$$

$$P_{SP_{8,i}}(x, y, z) = toprightpoint(x, y, z)$$

$$P_{SP_{9,i}}(x, y, z) = bottomrightpoint(x, y, z)$$

where $P_{SP_{1,i}}(x, y, z)$ is the position of the virtual loudspeaker 1430, $P_{SP_{2,i}}(x, y, z)$ is the position of the virtual loudspeaker 1422, $P_{SP_{3,i}}(x, y, z)$ is the position of the virtual loudspeaker 1423, $P_{SP_{4,i}}(x, y, z)$ is the position of the virtual loudspeaker 1424, $P_{SP_{5,i}}(x, y, z)$ is the position of the virtual loudspeaker 1425, $P_{SP_{6,i}}(x, y, z)$ is the position of the virtual loudspeaker 1426, $P_{SP_{7,i}}(x, y, z)$ is the position of the virtual loudspeaker 1427, $P_{SP_{8,i}}(x, y, z)$ is the position of the virtual loudspeaker 1428, and $P_{SP_{9,i}}(x, y, z)$ is the position of the virtual loudspeaker 1429.

centerpoint(x, y, z) is the center point of the 2D representation 1400 of the audio element 102, leftedgepoint(x, y, z) is the center point of the left side of the 2D representation 1400, rightedgepoint(x, y, z) is the center point of the right side of the 2D representation 1400, topedgepoint(x, y, z) is the center point of the top side of the 2D representation 1400, bottomedgepoint(x, y, z) is the center point of the bottom side of the 2D representation 1400, topleftpoint(x, y, z) is the position of the top left corner of the 2D representation 1400, and bottomleftpoint(x, y, z) is the position of the bottom left corner of the 2D representation 1400, topleftpoint(x, y, z) is the position of the top left corner of the 2D representation 1400, and bottomleftpoint(x, y, z) is the position of the bottom left corner of the 2D representation 1400.

Like the embodiments shown in FIG. 13, in the embodiments shown in FIG. 14, to switch the representation of the audio element 102 from the point source representation to the 2D representation, there is no need to adjust the number of virtual loudspeakers. Only the gains of the virtual loudspeakers need to be adjusted to perform the switching. However, changing the gains of the virtual loudspeakers suddenly may result in an undesirable artifact in the audio signal output for rendering the audio element 102.

Thus, to smooth the transition from the point source representation to the 2D representation, the gain of each of the virtual loudspeakers may be adjusted gradually, thereby going through the first and second intermediate representations 1404 and 1406.

In some embodiments, the degree of adjusting the gains may depend on the azimuth angle 122 and the elevation angle 124 (e.g., linearly, exponentially or trigonometrically). For example, $$SG_{1,i} = SG_{1,i}^{0}$$

$$SG_{6,i} = d * \sin(\alpha) * \sin(\beta) * SG_{6,i}^{0}$$

$$SG_{7,i} = d * \sin(\alpha) * \sin(\beta) * SG_{7,i}^{0}$$

$$SG_{8,i} = d * \sin(\alpha) * \sin(\beta) * SG_{8,i}^{0}$$

$$SG_{9,i} = d * \sin(\alpha) * \sin(\beta) * SG_{9,i}^{0}$$

$$SG_{2,i} = p * \sin(\alpha) * (1 - d * \sin(\alpha) * (\sin(\beta)) * SG_{2,i}^{0}$$

$$SG_{3,i} = p * \sin(\alpha) * (1 - d * \sin(\alpha) * (\sin(\beta)) * SG_{3,i}^{0}$$

$$SG_{4,i} = p * \sin(\beta) * (1 - d * \sin(\alpha) * (\sin(\beta)) * SG_{4,i}^{0}$$

$$SG_{5,i} = p * \sin(\beta) * (1 - d * \sin(\alpha) * (\sin(\beta)) * SG_{5,i}^{0}$$

where $SG_{1,i}$ is the gain of the virtual loudspeaker 1430, $SG_{2,i}$ is the gain of the virtual loudspeaker 1422, $SG_{3,i}$ is the gain of the virtual loudspeaker 1423, $SG_{4,i}$ is the gain of the virtual loudspeaker 1424, $SG_{5,i}$ is the gain of the virtual loudspeaker 1425, $SG_{6,i}$ is the gain of the virtual loudspeaker 1426, $SG_{7,i}$ is the gain of the virtual loudspeaker 1427, $SG_{8,i}$ is the gain of the virtual loudspeaker 1428, and $SG_{9,i}$ is the gain of the virtual loudspeaker 1429.

Similarly, $$SG_{1,i}^{0}$$

is the default gain of the virtual loudspeaker 1430, $$SG_{2,i}^{0}$$

is the default gain of the virtual loudspeaker 1422, $$SG_{3,i}^{0}$$

is the default gain of the virtual loudspeaker 1423, $$SG_{4,i}^{0}$$

is the default gain of the virtual loudspeaker 1424, $$SG_{5,i}^{0}$$

is the default gain of the virtual loudspeaker 1425, $$SG_{6,i}^{0}$$

is the default gain of the virtual loudspeaker 1426, $$SG_{7,i}^{0}$$

is the default gain of the virtual loudspeaker 1427, $$SG_{8,i}^{0}$$

is the default gain of the virtual loudspeaker 1428, and $$SG_{9,i}^{0}$$

is the default gain of the virtual loudspeaker 1429. Each of the default gains may be predetermined.

d may be a variable that controls how fast/slow to fade-in and/or fade-out the virtual loudspeakers 1426-1429 and p may be a variable that controls how fast/slow to fade-in and/or fade-out the virtual loudspeakers 1422-1425. In some embodiments, both d and p are chosen such that:

$$0 \le d * \sin(\alpha) * \sin(\beta) \le 1$$

$$0 \le p * \sin(\alpha) \le 1$$

$$0 \le p * \sin(\beta) \le 1$$

In the above embodiments, the gain of the virtual loudspeakers 1422-1429 that surround the center virtual loudspeaker 1430 is faded-in as either the width angle or the height angle increases (by using the coefficient p*sin(α) or p*sin(β)) and faded-out as both of the width angle and the height angle decrease (by using the coefficient (1−d*sin(α)*(sin(β))).

Example Use Cases

Figure 15A:
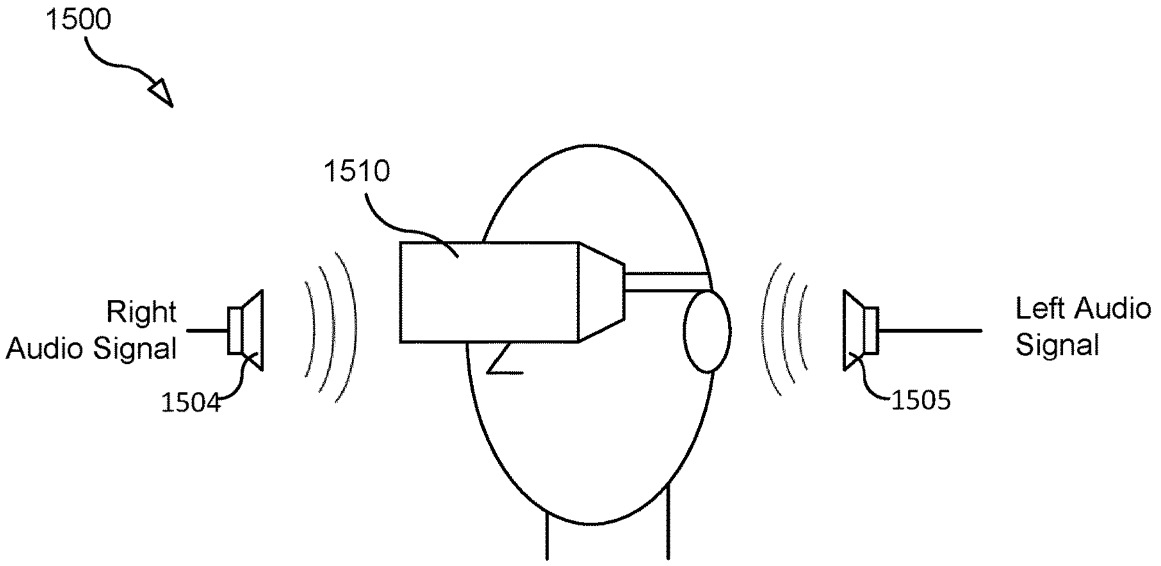
FIGS. 15A and 15B illustrate a system according to some embodiments.

FIG. 15A illustrates an XR system 1500 in which the embodiments disclosed herein may be applied. XR system 1500 includes speakers 1504 and 1505 (which may be speakers of headphones worn by the listener) and an XR device 1510 that may include a display for displaying images to the user and that, in some embodiments, is configured to be worn by the listener. In the illustrated XR system 1500, XR device 1510 has a display and is designed to be worn on the user's head and is commonly referred to as a head-mounted display (HMD).

Figure 15B:
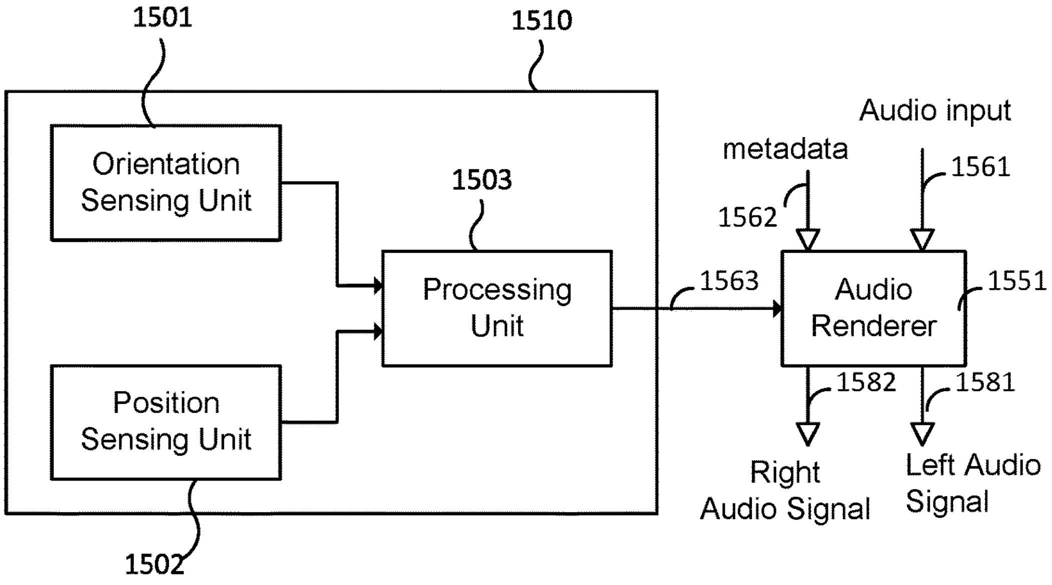

As shown in FIG. 15B, XR device 1510 may comprise an orientation sensing unit 1501, a position sensing unit 1502, and a processing unit 1503 coupled (directly or indirectly) to an audio render 1551 for producing output audio signals (e.g., a left audio signal 1581 for a left speaker and a right audio signal 1582 for a right speaker as shown).

Orientation sensing unit 1501 is configured to detect a change in the orientation of the listener and provides information regarding the detected change to processing unit 1503. In some embodiments, processing unit 1503 determines the absolute orientation (in relation to some coordinate system) given the detected change in orientation detected by orientation sensing unit 1501. There could also be different systems for determination of orientation and position, e.g. a system using lighthouse trackers (lidar). In one embodiment, orientation sensing unit 1501 may determine the absolute orientation (in relation to some coordinate system) given the detected change in orientation. In this case the processing unit 1503 may simply multiplex the absolute orientation data from orientation sensing unit 1501 and positional data from position sensing unit 1502. In some embodiments, orientation sensing unit 1101 may comprise one or more accelerometers and/or one or more gyroscopes.

Audio renderer 1551 produces the audio output signals based on input audio signals 1561, metadata 1562 regarding the XR scene the listener is experiencing, and information 1563 about the location and orientation of the listener. The metadata 1562 for the XR scene may include metadata for each object and audio element included in the XR scene, and the metadata for an object may include information about the dimensions of the object. The metadata 1152 may also include control information, such as a reverberation time value, a reverberation level value, and/or an absorption parameter. Audio renderer 1551 may be a component of XR device 1510 or it may be remote from the XR device 1510 (e.g., audio renderer 1551, or components thereof, may be implemented in the so called "cloud").

Figure 16:
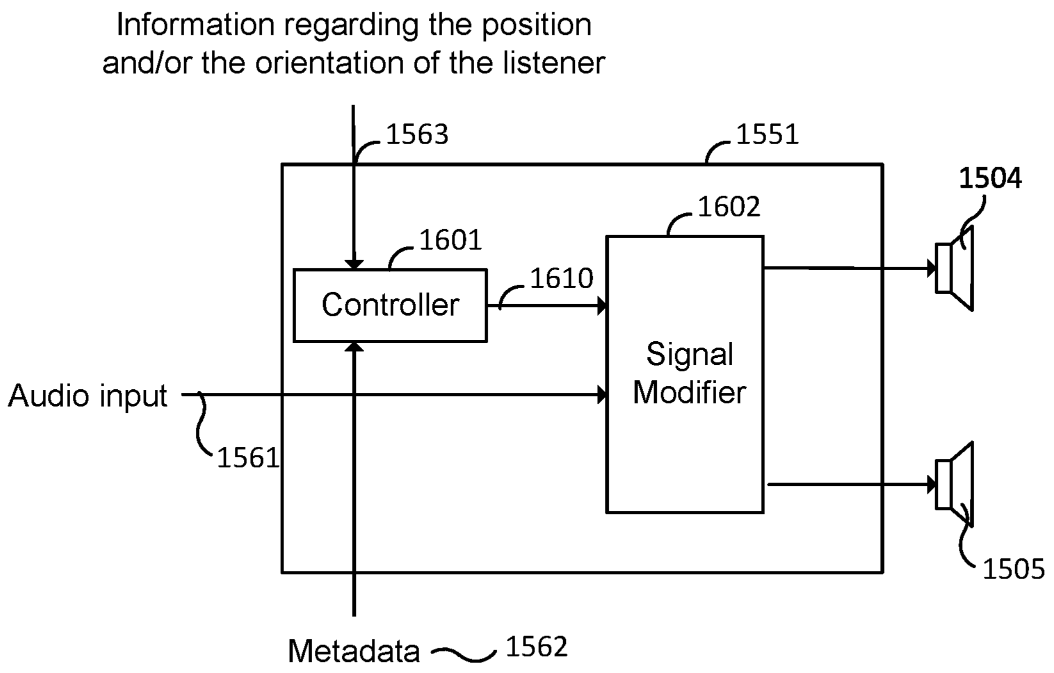
FIG. 16 is a block diagram of an apparatus according to some embodiments.

FIG. 16 shows an example implementation of audio renderer 1551 for producing sound for the XR scene. Audio renderer 1600 includes a controller 1601 and a signal modifier 1602 for modifying audio signal(s) 1251 (e.g., the audio signals of a multi-channel audio element) based on control information 1610 from controller 1601. Controller 1601 may be configured to receive one or more parameters and to trigger modifier 1602 to perform modifications on audio signals 1561 based on the received parameters (e.g., increasing or decreasing the volume level). The received parameters include information 1563 regarding the position and/or orientation of the listener (e.g., direction and distance to an audio element) and metadata 1552 regarding an audio element in the XR scene (e.g., extent) (in some embodiments, controller 1601 itself produces the metadata 1562). Using the metadata and position/orientation information, controller 1601 may calculate one more gain factors (g) (a.k.a., attenuation factors) for an audio element in the XR scene as described herein.

Figure 17:
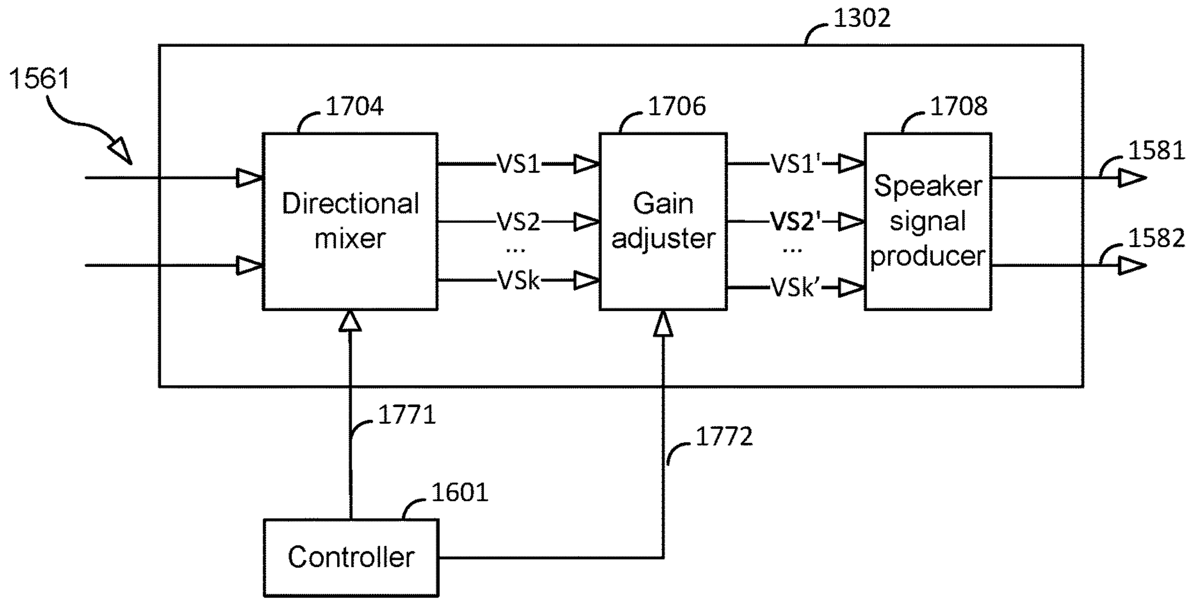
FIG. 17 illustrates a signal modifier according to some embodiments.

FIG. 17 shows an example implementation of signal modifier 1602 according one embodiment. Signal modifier 1602 includes a directional mixer 1704, a gain adjuster 1406, and a speaker signal producer 1708.

Directional mixer receives audio input 1561, which in this example includes a pair of audio signals 1701 and 1702 associated with an audio element (e.g. the audio element associated with extent), and produces a set of k virtual loudspeaker signals (VS1, VS2, . . . , VSk) based on the audio input and control information 1791. In one embodiment, the signal for each virtual loudspeaker can be derived by, for example, the appropriate mixing of the signals that comprise the audio input 1561. For example: VS1=α×L+β×R, where L is input audio signal 1701, R is input audio signal 1702, and α and β are factors that are dependent on, for example, the position of the listener relative to the audio element and the position of the virtual loudspeaker to which VS1 corresponds.

Gain adjuster 1706 may adjust the gain of any one or more of the virtual loudspeaker signals based on control information 1792, which may include the above described gain factors as calculated by controller 1601. That is, for example, when the middle speaker is placed close to another speaker (e.g., left speaker 202 as shown in FIG. 4), controller 1601 may control gain adjuster 1706 to adjust the gain of the virtual loudspeaker signal for middle speaker by providing to gain adjuster 1406 a gain factor calculated as described above.

Using virtual loudspeaker signals VS1, VS2, . . . , VSk, speaker signal producer produces output signals (e.g., output signal 1581 and output signal 1582) for driving speakers (e.g., headphone speakers or other speakers). In one embodiment where the speakers are headphone speakers, speaker signal producer 1508 may perform conventional binaural rendering to produce the output signals. In embodiments where the speakers are not headphone speakers, speaker signal produce may perform conventional speaking panning to produce the output signals.

Figure 18:
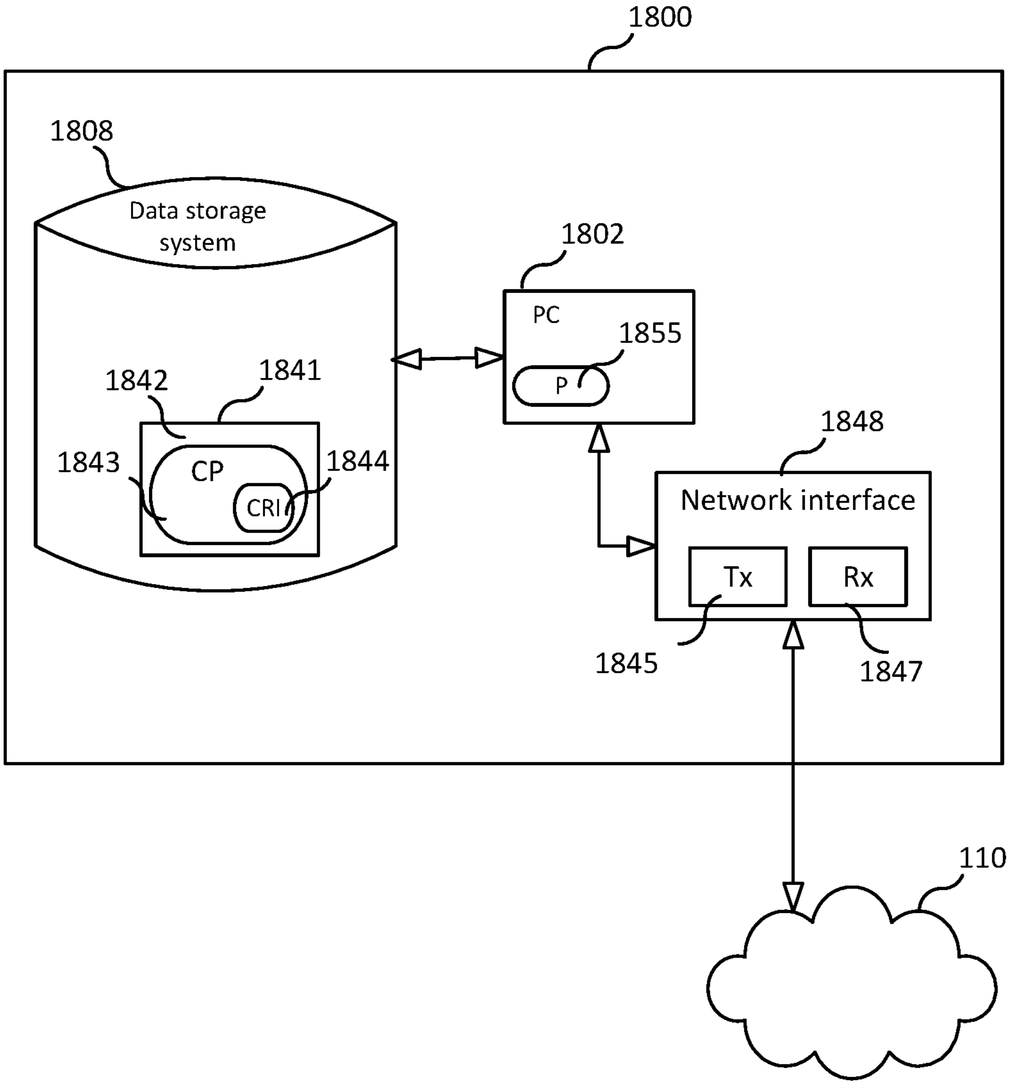
FIG. 18 is a block diagram of an apparatus according to some embodiments.

FIG. 18 is a block diagram of an audio rendering apparatus 1800, according to some embodiments, for performing the methods disclosed herein (e.g., audio renderer 1151 may be implemented using audio rendering apparatus 1800). As shown in FIG. 18, audio rendering apparatus 1800 may comprise: processing circuitry (PC) 1802, which may include one or more processors (P) 1855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1800 may be a distributed computing apparatus); at least one network interface 1848 comprising a transmitter (Tx) 1845 and a receiver (Rx) 1847 for enabling apparatus 1800 to transmit data to and receive data from other nodes connected to a network 110 (e.g., an Internet Protocol (IP) network) to which network interface 1848 is connected (directly or indirectly) (e.g., network interface 1848 may be wirelessly connected to the network 110, in which case network interface 1848 is connected to an antenna arrangement); and a storage unit (a.k.a., "data storage system") 1808, which may include one or more non-volatile storage devices and/or one or more volatile storage devices. In embodiments where PC 1802 includes a programmable processor, a computer readable medium (CRM) 1842 may be provided. CRM 1842 stores a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some embodiments, the CRI 1844 of computer program 1843 is configured such that when executed by PC 1802, the CRI causes audio rendering apparatus 1800 to perform steps described herein (e.g., steps described herein with reference to the flow charts). In other embodiments, audio rendering apparatus 1800 may be configured to perform steps described herein without the need for code. That is, for example, PC 1802 may consist merely of one or more ASICs. Hence, the features of the embodiments described herein may be implemented in hardware and/or software.

Figure 19:
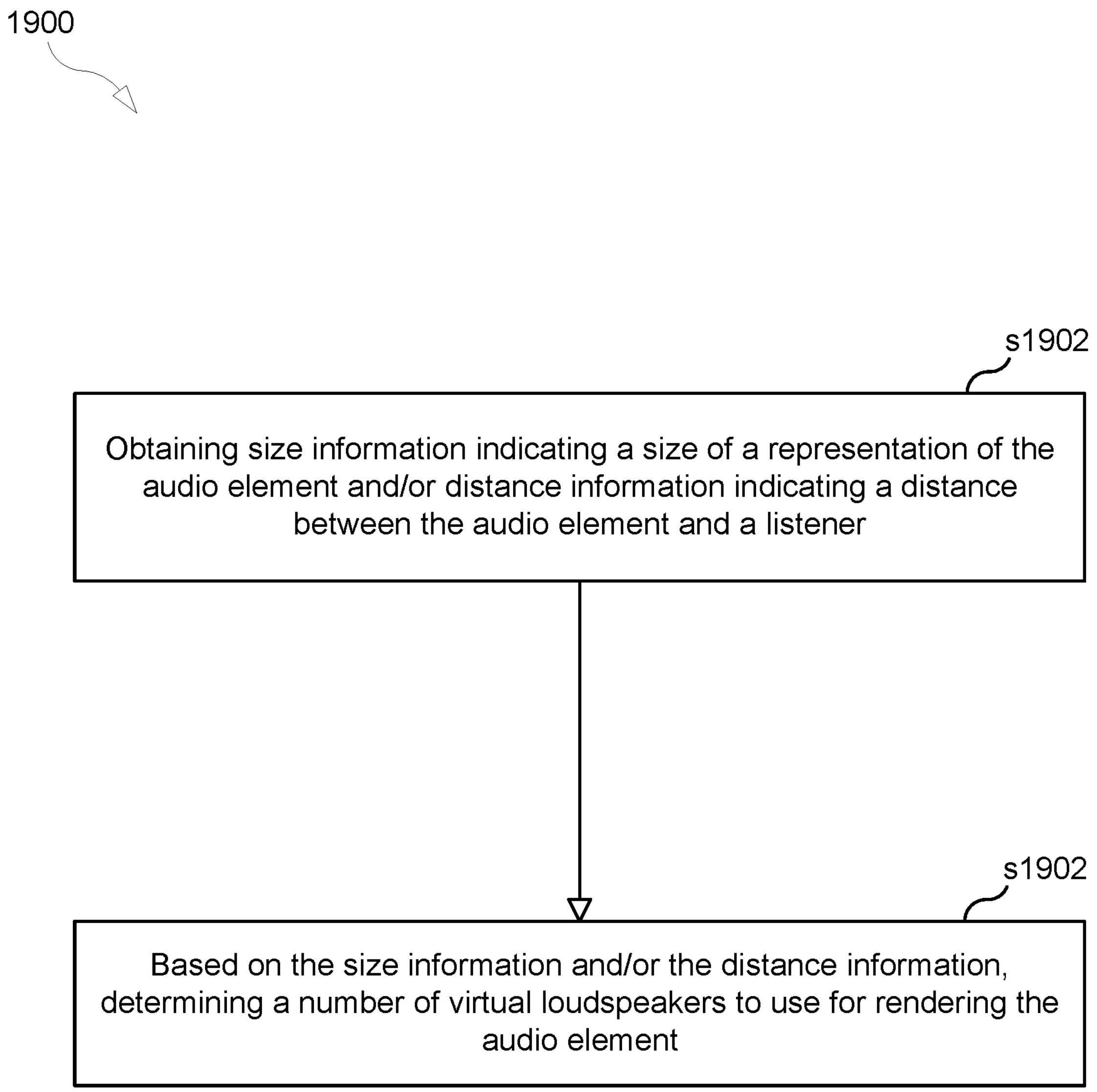
FIG. 19 shows a process according to some embodiments.

FIG. 19 shows a process 1900 for rendering the audio element 102 according to some embodiments. Process 1900 may begin with step s1902. Step s1902 comprises obtaining size information indicating a size of a representation of the audio element and/or distance information indicating a distance between the audio element and a listener. Step s1904 comprises based on the size information and/or the distance information, determining a number of virtual loudspeakers to use for rendering the audio element.

In some embodiments, the size of the representation is a width of the representation and/or a height of the representation, the method comprises determining (i) a width angle value associated with the width of the representation and the distance and/or (ii) a height angle value associated with the height of the representation and the distance, and the number of the virtual loudspeakers to use for rendering the audio element is determined based on the width angle value and/or the height angle value.

In some embodiments, the method further comprises (i) comparing the width angle value with a first threshold value; and (ii) comparing the height angle value with a second threshold value, wherein the number of the virtual loudspeakers to use for rendering the audio element is determined based on the comparison (i) and/or the comparison (ii).

In some embodiments, the number of the virtual loudspeakers to use for rendering the audio element is determined to be a first value if (i) the width angle value is less than the first threshold value and (ii) the height angle value is less than the second threshold value. The number of the virtual loudspeakers to use for rendering the audio element is determined to be a second value if (i) the width angle value is greater than or equal to the first threshold value and (ii) the height angle value is less than the second threshold value. The number of the virtual loudspeakers to use for rendering the audio element is determined to be the second value if (i) the width angle value is less than the first threshold value and (ii) the height angle value is greater than or equal to the second threshold value. The number of the virtual loudspeakers to use for rendering the audio element is determined to be a third value if (i) the width angle value is greater than or equal to the first threshold value and (ii) the height angle value is greater than or equal to the second threshold value.

In some embodiments, the width angle value is determined based on $$\sin\frac{c\times a}{2}$$

or the height angle value is determined based on $$\sin\frac{c\times e}{2},$$

where c is a constant. a is an angle formed by a line between the listener and a first point on a first side of the representation and a line between the listener and a second point on a second side of the representation. The first side is opposite to the second side and e is an angle formed by a line between the listener and a third point on a third side of the representation and a line between the listener and a fourth point on a fourth side of the representation. The third side is opposite to the fourth side.

In some embodiments, the method further comprises determining positions of the virtual loudspeakers, wherein the positions of the virtual loudspeakers are determined based on a boundary of the representation.

In some embodiments, the determined number of the virtual loudspeakers is one, and the position of the virtual loudspeaker is the center of the representation.

In some embodiments, the determined number of the virtual loudspeakers is more than two, and the virtual loudspeakers comprise a first virtual loudspeaker, a second virtual loudspeaker, and third virtual loudspeaker. A position of the first virtual loudspeaker is the center of the representation, and a position of the second virtual loudspeaker and a position of the third virtual loudspeaker are symmetric with respect to a line through the position of the first virtual loudspeaker. For example, the position of the first virtual speaker is a center point between the position of the second virtual loudspeaker and the position of the third virtual loudspeaker.

In some embodiments, the method further comprises obtaining changed distance information indicating a changed distance between the audio element and the listener, and based on the size information and the changed distance information, re-determining a number of virtual loudspeakers to use for rendering the audio element.

In some embodiments, the determined number of the virtual loudspeakers is 1 and the virtual loudspeakers of which the number is determined includes a first virtual loudspeaker, the redetermined number of the virtual loudspeakers is 3 and the virtual loudspeakers of which the number is redetermined includes the first virtual loudspeaker, a second virtual loudspeaker, and a third virtual loudspeaker, and an audio gain associated with the second virtual loudspeaker and/or an audio gain associated with the third virtual loudspeaker is a function of an angle (a or e) formed by a line between the listener and a position of the second virtual loudspeaker and a line between the listener and a position of the third virtual loudspeaker.

In some embodiments, the function is equal to $$c_1\times\sin\left(c_2\times\frac{a}{2}\right),$$

where each of $c_1$ and $c_2$ is a constant.

In some embodiments, the method further comprises obtaining changed distance information indicating a changed distance between the audio element and the listener; and based on the size information and the changed distance information, obtaining an updated representation of the audio element and determining an updated number of virtual loudspeakers to use for the updated representation of the audio element.

In some embodiments, the determined representation of the audio element is a one-dimensional, 1D, representation of the audio element, and the determined updated representation of the audio element is a two-dimensional, 2D, representation of the audio element.

In some embodiments, the 1D representation of the audio element comprises a first virtual loudspeaker, a second virtual loudspeaker, and a third virtual loudspeaker, the 2D representation of the audio element comprises the first virtual loudspeaker, the second virtual loudspeaker, and the third virtual loudspeaker, a fourth virtual loudspeaker, and a fifth virtual loudspeaker, and the method further comprises (i) moving the second virtual loudspeaker from a first coordinate towards a first boundary coordinate of the updated representation of the audio element and (ii) moving the third virtual loudspeaker from a second coordinate towards a second boundary coordinate of the updated representation of the audio element.

In some embodiments, a current coordinate of the second virtual loudspeaker depends on (the first coordinate×(1−f(e))+(the first boundary coordinate×f(e)), a current coordinate of the third virtual loudspeaker depends on (the second coordinate×(1−f(e))+(the second boundary coordinate×f(e)), and e is a value of an angle related to a width or a height of the 2D representation. f(e) is a function of the value e. One example of f(e) is $$\sin\left(c_1 \times \frac{e}{2}\right).$$

In some embodiments, the method further comprises determining an audio gain associated with the fourth virtual loudspeaker and/or an audio gain associated with the fifth virtual loudspeaker, wherein the audio gain associated with the fourth virtual loudspeaker and/or the audio gain associated with the fifth virtual loudspeaker is a function, $f$, of (i) a width angle associated with the width of the updated representation of the audio element and the distance and/or (ii) a height angle associated with the height of the updated representation of the audio element and the distance.

In some embodiments, the function is $$f(p) = \begin{cases} 0, & p < p_{st} \\ g(p), & p_{st} \le p \le p_{end} \\ 0.5, & p > p_{end} \end{cases}, \text{ where}$$

p is equal to ($c_1$×the width angle or the height angle), $p_{st}$ is a lower threshold value, $p_{end}$ is a higher threshold value, $c_1$ is a constant, and g(p) is a function of which an output value increases as p increases. g(p) is greater than 0 but is less than or equal to 0.5.

In some embodiments, the audio gain associated with the second virtual loudspeaker and/or the audio gain associated with the third virtual loudspeaker is set based on (1−f(p)).

In some embodiments, the determined representation of the audio element is a point representation of the audio element, and the determined updated representation of the audio element is a two-dimensional, 2D, representation of the audio element.

In some embodiments, the point representation of the audio element comprises a first virtual loudspeaker, and the 2D representation of the audio element comprises the first virtual loudspeaker, a second virtual loudspeaker, a third virtual loudspeaker, a fourth virtual loudspeaker, and a fifth virtual loudspeaker. The method further comprises moving one or more of the second virtual loudspeaker, the third virtual loudspeaker, the fourth virtual loudspeaker, and the fifth virtual loudspeaker using a moving path function, and the moving path function is a function of (i) a width angle associated with the width of the updated representation of the audio element and the distance and (ii) a height angle associated with the height of the updated representation of the audio element and the distance.

In some embodiments, the moving path function is a function of $$\sin\left(c_1 \times \frac{\text{width angle}}{2}\right) \times \sin\left(c_2 \times \frac{\text{height angle}}{2}\right)$$

where each of $c_1$ and $c_2$ is a constant.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for rendering an audio element, the method comprising:

obtaining size information indicating a size of a representation of the audio element and/or distance information indicating a distance between the audio element and a listener position; and based on the size information and/or the distance information, determining a number of virtual loudspeakers to use for rendering the audio element, wherein the size of the representation is a width of the representation and/or a height of the representation, the method comprises determining (i) a width angle value associated with the width of the representation and the distance and/or (ii) a height angle value associated with the height of the representation and the distance, and the number of the virtual loudspeakers to use for rendering the audio element is determined based on the width angle value and/or the height angle value.

2. The method of claim 1, the method comprising:

(i) comparing the width angle value with a first threshold value; and (ii) comparing the height angle value with a second threshold value, wherein the number of the virtual loudspeakers to use for rendering the audio element is determined based on the comparison (i) and/or the comparison (ii).

3. The method of claim 2, wherein the number of the virtual loudspeakers to use for rendering the audio element is determined to be a first value if (i) the width angle value is less than the first threshold value and (ii) the height angle value is less than the second threshold value, the number of the virtual loudspeakers to use for rendering the audio element is determined to be a second value if (i) the width angle value is greater than or equal to the first threshold value and (ii) the height angle value is less than the second threshold value, the number of the virtual loudspeakers to use for rendering the audio element is determined to be the second value if (i) the width angle value is less than the first threshold value and (ii) the height angle value is greater than or equal to the second threshold value, and the number of the virtual loudspeakers to use for rendering the audio element is determined to be a third value if (i) the width angle value is greater than or equal to the first threshold value and (ii) the height angle value is greater than or equal to the second threshold value.

4. The method of claim 1, wherein the width angle value is determined based on $$\sin\frac{c \times a}{2}$$

or the height angle value is determined based on $$\sin\frac{c \times e}{2},$$

where c is a constant, a is an angle formed by a line between the listener position and a first point on a first side of the representation and a line between the listener position and a second point on a second side of the representation, the first side is opposite to the second side, e is an angle formed by a line between the listener position and a third point on a third side of the representation and a line between the listener position and a fourth point on a fourth side of the representation, and the third side is opposite to the fourth side.

5. The method of claim 1, the method further comprising: determining positions of the virtual loudspeakers, wherein the positions of the virtual loudspeakers are determined based on a boundary of the representation.

6. The method of claim 5, wherein the determined number of the virtual loudspeakers is one, and the position of the virtual loudspeaker is the center of the representation.

7. The method of claim 5, wherein the determined number of the virtual loudspeakers is more than two, the virtual loudspeakers comprise a first virtual loudspeaker, a second virtual loudspeaker, and a third virtual loudspeaker, a position of the first virtual loudspeaker is the center of the representation, and a position of the second virtual loudspeaker and a position of the third virtual loudspeaker are symmetric with respect to a line through the position of the first virtual loudspeaker.

8. The method of claim 1, the method further comprising:

obtaining changed distance information indicating a changed distance between the audio element and the listener position; and based on the size information and the changed distance information, re-determining a number of virtual loudspeakers to use for rendering the audio element.

9. The method of claim 8, wherein the determined number of the virtual loudspeakers is 1 and the virtual loudspeakers of which the number is determined includes a first virtual loudspeaker, the redetermined number of the virtual loudspeakers is 3 and the virtual loudspeakers of which the number is redetermined includes the first virtual loudspeaker, a second virtual loudspeaker, and a third virtual loudspeaker, and an audio gain associated with the second virtual loudspeaker and/or an audio gain associated with the third virtual loudspeaker is a function of an angle formed by a line between the listener position and a position of the second virtual loudspeaker and a line between the listener position and a position of the third virtual loudspeaker.

10. The method of claim 1, the method further comprising:

obtaining changed distance information indicating a changed distance between the audio element and the listener position; and based on the size information and the changed distance information, obtaining an updated representation of the audio element and determining an updated number of virtual loudspeakers to use for the updated representation of the audio element.

11. The method of claim 10, wherein the determined representation of the audio element is a one-dimensional, 1D, representation of the audio element, and the determined updated representation of the audio element is a two-dimensional, 2D, representation of the audio element, the 1D representation of the audio element comprises a first virtual loudspeaker, a second virtual loudspeaker, and a third virtual loudspeaker, the 2D representation of the audio element comprises the first virtual loudspeaker, the second virtual loudspeaker, the third virtual loudspeaker, a fourth virtual loudspeaker, and a fifth virtual loudspeaker, and the method further comprises (i) moving the second virtual loudspeaker from a first coordinate towards a first boundary coordinate of the updated representation of the audio element and (ii) moving the third virtual loudspeaker from a second coordinate towards a second boundary coordinate of the updated representation of the audio element.

12. The method of claim 11, wherein a current coordinate of the second virtual loudspeaker depends on (the first coordinate×(1−f(e))+the first boundary coordinate×f(e)), a current coordinate of the third virtual loudspeaker depends on (the second coordinate×(1−f(e))+the second boundary coordinate×f(e)), and e is a value of an angle related to a width or a height of the 2D representation.

13. The method of claim 11, the method further comprising:

determining an audio gain associated with the fourth virtual loudspeaker and/or an audio gain associated with the fifth virtual loudspeaker, wherein the audio gain associated with the fourth virtual loudspeaker and/or the audio gain associated with the fifth virtual loudspeaker is a function, $f$, of (i) a width angle associated with the width of the updated representation of the audio element and the distance and/or (ii) a height angle associated with the height of the updated representation of the audio element and the distance.

14. The method of claim 13, wherein the function is $$f(p) = \begin{cases} 0, & p < p_{st} \\ g(p), & p_{st} \le p \le p_{end} \\ 0.5, & p > p_{end} \end{cases}, \text{ where}$$

p is equal to ($c_1$×the width angle or the height angle), $p_{st}$ is a lower threshold value, $p_{end}$ is a higher threshold value, $c_1$ is a constant, and g(p) is a function of which an output value increases as p increases.

15. The method of claim 14, wherein g(p) is greater than 0 but is less than or equal to 0.5.

16. The method of claim 13, wherein the audio gain associated with the second virtual loudspeaker and/or the audio gain associated with the third virtual loudspeaker is set based on (1−f(p)).

17. The method of claim 10, wherein the determined representation of the audio element is a point representation of the audio element, the determined updated representation of the audio element is a two-dimensional, 2D, representation of the audio element, the point representation of the audio element comprises a first virtual loudspeaker, the 2D representation of the audio element comprises the first virtual loudspeaker, a second virtual loudspeaker, a third virtual loudspeaker, a fourth virtual loudspeaker, and a fifth virtual loudspeaker, the method further comprises moving one or more of the second virtual loudspeaker, the third virtual loudspeaker, the fourth virtual loudspeaker, and the fifth virtual loudspeaker using a moving path function, the moving path function is a function of (i) a width angle associated with the width of the updated representation of the audio element and the distance and (ii) a height angle associated with the height of the updated representation of the audio element and the distance.

18. An apparatus for rendering an audio element, the apparatus comprising:

a memory; and processing circuitry coupled to the memory, wherein the apparatus is configured to:

obtain size information indicating a size of a representation of the audio element and/or distance information indicating a distance between the audio element and a listener position; and based on the size information and/or the distance information, determine a number of virtual loudspeakers to use for rendering the audio element, wherein the size of the representation is a width of the representation and/or a height of the representation, the method comprises determining (i) a width angle value associated with the width of the representation and the distance and/or (ii) a height angle value associated with the height of the representation and the distance, and the number of the virtual loudspeakers to use for rendering the audio element is determined based on the width angle value and/or the height angle value.

19. A non-transitory computer readable storage medium storing a computer program, the computer program comprising computer program code, which, when run on processing circuitry of a device for rendering an audio element causes the device to:

obtain size information indicating a size of a representation of the audio element and/or distance information indicating a distance between the audio element and a listener position; and based on the size information and/or the distance information, determine a number of virtual loudspeakers to use for rendering the audio element, wherein the size of the representation is a width of the representation and/or a height of the representation, the method comprises determining (i) a width angle value associated with the width of the representation and the distance and/or (il) a height angle value associated with the height of the representation and the distance, and the number of the virtual loudspeakers to use for rendering the audio element is determined based on the width angle value and/or the height angle value.

* * * * *